US012619179B2

(12) United States Patent
Kodama

(10) Patent No.: US 12,619,179 B2
(45) Date of Patent: May 5, 2026

(54) IMAGE FORMING APPARATUS AND OPERATION METHOD FOR IMAGE FORMING APPARATUS

(71) Applicant: SHARP KABUSHIKI KAISHA, Sakai City (JP)

(72) Inventor: Naoki Kodama, Sakai City (JP)

(73) Assignee: SHARP KABUSHIKI KAISHA, Sakai City (JP)

( * ) Notice: Subject to any disclaimer, the term of this patent is extended or adjusted under 35 U.S.C. 154(b) by 6 days.

(21) Appl. No.: 18/797,293

(22) Filed: Aug. 7, 2024

(65) Prior Publication Data

US 2025/0053122 A1 Feb. 13, 2025

(30) Foreign Application Priority Data

Aug. 9, 2023 (JP) ................................. 2023-130458

(51) Int. Cl.
*G03G 15/20* (2006.01)
*G03G 15/00* (2006.01)

(52) U.S. Cl.
CPC ..... *G03G 15/2039* (2013.01); *G03G 15/2017* (2013.01); *G03G 15/5016* (2013.01); *G03G 15/5045* (2013.01)

(58) Field of Classification Search
CPC ........... G03G 15/2039; G03G 15/2017; G03G 15/5016; G03G 15/5045
See application file for complete search history.

(56) References Cited

U.S. PATENT DOCUMENTS

| | | | | |
|---|---|---|---|---|
| 5,747,777 | A * | 5/1998 | Matsuoka | G03G 15/2003 219/505 |
| 5,911,094 | A * | 6/1999 | Tsujimoto | G05D 23/24 219/619 |
| 6,324,361 | B1 * | 11/2001 | Itoh | G03G 21/206 399/92 |
| 2006/0044612 | A1 * | 3/2006 | Kayama | G06F 3/1288 358/1.15 |
| 2009/0142133 | A1 * | 6/2009 | Glee | E01C 19/48 404/90 |
| 2011/0188883 | A1 * | 8/2011 | Tokuyama | G03G 15/20 399/109 |
| 2013/0249977 | A1 * | 9/2013 | Shiba | B41J 2/145 347/44 |
| 2014/0169850 | A1 * | 6/2014 | Matsuo | G03G 15/2039 399/341 |
| 2014/0249971 | A1 * | 9/2014 | Susaki | G06Q 20/32 705/30 |
| 2015/0253706 | A1 * | 9/2015 | Chikazawa | G03G 15/2039 399/69 |
| 2018/0150270 | A1 * | 5/2018 | Harayama | G06F 3/1205 |

FOREIGN PATENT DOCUMENTS

JP 2017-003725 A 1/2017

* cited by examiner

*Primary Examiner* — David H Banh
(74) *Attorney, Agent, or Firm* — ScienBiziP, P.C.

(57) ABSTRACT

An image forming apparatus comprises one or more controllers, a display, a detachable fixing unit, and a temperature measurer that measures a temperature of the fixing unit or in the vicinity thereof, wherein the one or more controllers display, on the display, prediction information related to finishing of a cooling operation of cooling the mounted fixing unit, based on a measurement result by the temperature measurer.

11 Claims, 27 Drawing Sheets

IMAGE FORMING APPARATUS AND OPERATION METHOD FOR IMAGE FORMING APPARATUS

CROSS-REFERENCE TO RELATED APPLICATION

The present application claims priority from Japanese Application JP2023-130458, the content of which is hereby incorporated by reference into this application.

BACKGROUND OF THE INVENTION

1. Field of the Invention

The present disclosure relates to an image forming apparatus and the like.

2. Description of the Related Art

Conventionally, as a printing method for an image forming apparatus such as a printer or a multi function peripheral, there is a dry electrophotographic method (laser printer method). In the laser printer method, after an image is formed on a sheet by transferring toner, the image is fixed on the sheet by applying heat and pressure to the image on the sheet. Therefore, an image forming apparatus that performs printing by the laser printer method includes a fixing device for applying heat and pressure to an image on a sheet.

The fixing device includes a fixing member that comes into contact with a sheet on which an image to be fixed is formed. The fixing member is, for example, a fixing belt. The fixing belt is disposed in such a way that its longitudinal direction is orthogonal to a transport direction of a sheet. In the present application, the width of a sheet in a direction orthogonal to the sheet transport direction is referred to as a sheet width. For example, in a general multi function printer (MFP) having a scanner function, a sub scanning direction of a scanner coincides with the sheet transport direction, and a main scanning direction of the scanner is orthogonal to the sheet transport direction. Therefore, in a general MFP, a sheet width refers to the width of a sheet in the main scanning direction.

FIG. 26A is a diagram for describing scratches generated on a fixing belt, when an A5 sheet repeatedly passes. When an A5 sheet 301 repeatedly passes on a fixing belt 303, scratches 305 and 307 are generated on the fixing belt 303 at a position associated with the sheet width of the A5 sheet 301. A case is considered in which an A3 sheet 309 larger than the A5 sheet repeatedly passes on the same fixing belt 303, after these scratches are generated.

At this occasion, as illustrated in FIG. 26B, although scratches 311 and 313 are generated on the fixing belt 303 at a position associated with the sheet width of the A3 sheet 309, since the scratches 311 and 313 are present substantially on the outside the A3 sheet 309, the scratches 311 and 313 do not affect print quality of the A3 sheet 309. However, the scratches 305 and 307 caused by the A5 sheet 301 lie within the sheet width of the A3 sheet 309, which adversely affects print quality of the A3 sheet 309. Specifically, in the A3 sheet 309, stains 315 and 317 are generated on the A3 sheet 309 at a position associated with the scratches 305 and 307 caused by the A5 sheet 301.

To avoid this problem, operating a fixing belt only when a sheet of a specific sheet width is printed is considered. Specifically, as illustrated in FIG. 27A, whereas the fixing belt 303 is used when the A5 sheet 301 is printed, as illustrated in FIG. 27B, another fixing belt 321 is used when the A3 sheet 309 is printed. Although the scratches 305 and 307 are generated on the fixing belt 303 by repeatedly printing, and the scratches 311 and 313 are generated on the fixing belt 321, since a fixing belt is prepared for each sheet width, it is possible to avoid that scratches generated by printing a sheet of another sheet width adversely affect print quality.

As described above, another operation method in which a fixing belt or a fixing device is replaced is known. Types of media that can pass a fixing belt or a fixing device are diversified, and it is necessary to finely adjust a fixing condition that determines final image quality also depending on a thickness and surface properties of the media, a density and glossiness of an image of a product to be obtained, and the like. As a countermeasure against these problems, there has been known art of preparing a dedicated fixing device depending on a size of a sheet to pass or a type of a medium, and allowing a user to replace the fixing device as necessary, whereby optimum image quality can be acquired.

Since a fixing device after operation generally reaches a high temperature, when the fixing device is replaced, in consideration of the high temperature, it is required to wait for the fixing device to lower its temperature to a predetermined temperature before replacement work is carried out. In association with this, notifying a user as to whether a mounted fixing device is lowered to a predetermined temperature or less has been known.

SUMMARY OF THE INVENTION

According to the above related art, although the user is notified after the temperature of the fixing device becomes equal to or less than the predetermined temperature, the user is not notified of a time required for lowering the temperature. In general, it takes a certain amount of time for a high-temperature fixing device to lower its temperature to a predetermined temperature, however, a conventional image forming apparatus does not notify the user of the required time. Therefore, the user needs to constantly monitor a current temperature of the fixing device while the user waits for the temperature of the fixing device to fall. If this monitoring is neglected, the fixing device which has reached the predetermined temperature is left as it is, which may generate a waiting time that is originally unnecessary, and consequently, there is a risk that the entirety of replacement work of the fixing device is delayed.

An aspect of the present disclosure has been made in view of a problem as described above, and a task to be solved by the present disclosure is to improve efficiency of a required time for replacement work of a fixing device.

In order to solve the above problem, an aspect of the present disclosure is to provide an image forming apparatus including: one or more controllers; a display; a detachable fixing unit; and a temperature measurer that measures a temperature of the fixing unit or in the vicinity thereof. The one or more controllers display, on the display, prediction information related to finishing of a cooling operation of cooling the mounted fixing unit, based on a measurement result by the temperature measurer.

Further, an aspect of the present disclosure is to provide an operation method for an image forming apparatus provided with a detachable fixing unit. The operation method includes: measuring a temperature of the fixing unit or in the vicinity thereof; and displaying prediction information related to finishing of a cooling operation of cooling the mounted fixing unit based on a result of the measurement.

According to an aspect of the present disclosure, efficiency of a required time for replacement work of a fixing device can be achieved.

DETAILED DESCRIPTION OF THE INVENTION

1. Embodiment

1.1 Functional Configuration of Image Forming Apparatus 1

Figure 1:
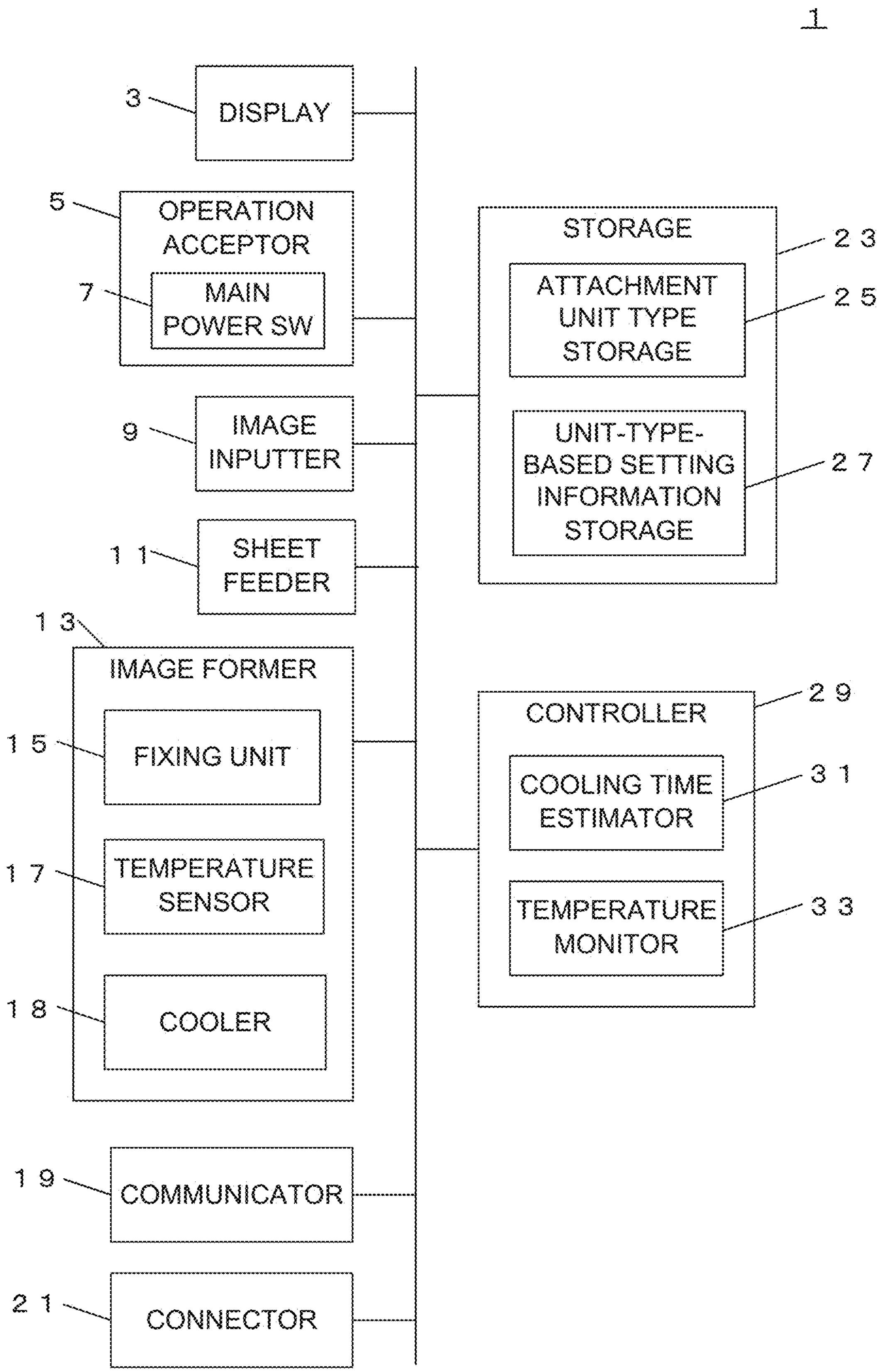
FIG. 1 is a functional block diagram of an image forming apparatus according to an embodiment of the present disclosure.

FIG. 1 is a functional block diagram of the image forming apparatus 1 according to an embodiment of the present disclosure. The image forming apparatus 1 is a multi-function printer (MFP) or a multi function peripheral, and typically includes a copy function, an image scanner function, a facsimile function, and a printer function. The image forming apparatus 1 may further include another function, and, for example, may include an electronic mail transmission/reception function, a file server function, and the like.

The image forming apparatus 1 includes a display 3, an operation acceptor 5, an image inputter 9, a sheet feeder 11, an image former 13, a communicator 19, a connector 21, a storage 23, and one or more controller 29. The operation acceptor 5 includes a main power SW7. The image former 13 includes a fixing unit 15, a temperature sensor 17, and a cooler 18. The storage 23 includes an attachment unit type storage 25, and a unit-type-based setting information storage 27. The one or more controller 29 include a cooling time estimator 31, and a temperature monitor 33.

The display 3 is a functional part for displaying an image o a character. For example, the display 3 is configured of a liquid crystal display (LCD), an organic electro-luminescence (EL) panel, or the like. The display 3 may be a single display device, or may further include a display device connected to the outside.

The operation acceptor 5 accepts an operation input from a user. For example, the operation acceptor 5 is configured of hardware keys or software keys. Further, the operation acceptor 5 includes, for example, a task key that executes a task such as fax transmission, or image reading, a stop key that stops an operation, and the like. Further, the operation acceptor may include a physical operation key such as a task key, a stop key, a power key, and a power saving key. The main power SW7 is a switch for turning on and off the main power of the image forming apparatus 1.

The display 3 and the operation acceptor 5 may be integrally configured. For example, a touch panel display may be used as the display 3 and the operation acceptor 5.

The image inputter 9 reads an image (document), and outputs the image, as image data. The image inputter 9 is configured of a general scanner (image input device). Further, the image inputter 9 may input image data from an external storage medium, for example, such as a USB memory, or may receive an image via a network. A sub scanning direction of the image inputter 9 coincides with a sheet transport direction by the sheet feeder 11.

The sheet feeder 11 includes a sheet feed tray that accommodates a medium such as paper, and a transport mechanism that transports the medium from the sheet feed tray to the image former 13. In addition, the sheet feeder 11 may include a sorter mechanism that sorts a medium (sheet) on which an image is formed, a sheet discharge tray that discharges the medium on which the image is formed, and a transport mechanism that transports the medium to the sheet discharge tray. Furthermore, the sheet feeder 11 may include a transport mechanism that transports a medium on which an image is formed to the image inputter 9, and a transport mechanism that transports the medium from which the image is read by the image inputter 9 to the sheet discharge tray, the sorter mechanism, or the like.

The sheet feeder 11 transports a medium along the sub scanning direction of the image inputter 9. In the present application, as described above, the width of a sheet in a direction orthogonal to the transport direction of a medium (sheet) is referred to as a sheet width. Therefore, in the present embodiment, the sheet width can also be referred to as a width of a sheet in the main scanning direction of the image inputter 9. The sheet feeder 11 transports a medium in such a way that a longitudinal direction of an unillustrated fixing belt of the fixing unit 15, and a transport direction of a medium are orthogonal to each other.

The image former 13 forms (prints) an image on a medium such as a copy sheet, based on image data. A printing method of the image former 13 is a laser printer. The image former 13 may also be a monochromatic laser printer or a color laser printer. The image former 13 may include a sheet feeding mechanism that supplies a medium, a transport mechanism that transports the medium, a sorter mechanism that sorts the medium after image formation, and the like. The fixing unit 15 is a fixing device, and fuses a toner image on a sheet by applying heat and pressure to the toner image transferred on the sheet. The temperature sensor 17 (temperature measurer) is a sensor that measures a temperature of the fixing unit 15. The temperature sensor 17 converts a temperature of the fixing unit 15 to a physical amount such as a voltage or a resistance value, and outputs the physical amount.

The cooler 18 is a device that performs a cooling operation of cooling the fixing unit 15. The cooler 18 may be the one that directly lowers a temperature of the fixing unit 15, or may be the one that indirectly lowers a temperature of the fixing unit 15 by lowering a temperature of air inside a housing of the image forming apparatus 1. A cooling principle of the cooler 18 is not specifically limited. For example, air cooling or water cooling may be available. A heat pump using a reverse carnot cycle like an electric refrigerator or an air conditioner may also be available, and a heat pump using a semiconductor such as Peltier element may also be available. Specifically, the cooler 18 is, for example, an electric fan that discharges air inside the housing of the image forming apparatus 1 to the outside of the housing. In FIG. 1, the cooler 18 is illustrated as a part of the image former 13, however, as far as the fixing unit 15 can be cooled, the cooler 18 may be provided outside of the image former 13. Further, when the image forming apparatus 1 is normally operated, an electric fan that discharges air for the purpose of mainly lowering a temperature of the one or more controller 29 may be configured to be operated also as the cooler 18 of the fixing unit 15 by rotating the electric fan at a higher speed than a normal state.

The communicator 19 is a functional part for connecting to a network. The communicator 19 is configured of, for example, an interface connectable to a wired local area network (LAN), a wireless LAN, or a long term evolution (LTE) network. By connecting the communicator 19 to a network, the communicator 19 is connected to another device or an external network.

The connector 21 connects the image forming apparatus 1 to another device. The connector 21 is, for example, a USB interface, and is connected to a USB memory or the like. Further, the connector 21 may be configured in such a way as to include a device (e.g., an antenna or the like) for performing short-range wireless communication such as near field communication (NFC), or Bluetooth (registered trademark).

Further, the communicator 19 and the connector 21 may be integrally configured. For example, a single wireless communication interface may be provided, and a wireless LAN or Bluetooth may be usable.

The storage 23 is a functional part in which various programs necessary for an operation of the image forming apparatus 1, and various pieces of data are stored. The storage 23 is the one including a temporarily storable recording device such as a dynamic random access memory (DRAM), and a non-transitory recording device such as, for example, a solid state drive (SSD) configured of a semiconductor memory, or a hard disk drive (HDD) configured of a magnetic disk. Further, although the storage 23 is configured as a single configuration for convenience of explanation, the storage 23 may be configured as separate devices for each individual purpose, such as an area (primary storage area) used for execution of a program, an area (auxiliary storage area) for storing a program and data, and an area used for caching.

The attachment unit type storage 25 stores a type (unit type) of the fixing unit 15 currently mounted to the image forming apparatus 1. The unit type is associated with a type of a sheet on which an image is fixed by using the fixing unit. The type of a sheet is, for example, a sheet width, a sheet material, a thickness, a shape (envelope), or the like, or combination thereof. The type of a sheet based on a sheet width includes, for example, a long side (420 mm) of A3 size, a short side of A3 size and a long side (297 mm) of A4 size, a short side of A4 size, a long side (210 mm) of A5 size, and the like. Also, a long side (515 mm) of B3 size, a short side of B3 size and a long side (364 mm) of B4 size, a short side of B4 size and a long side (257 mm) of B5 size, and the like are included.

The unit-type-based setting information storage 27 stores setting information of the image forming apparatus 1 defined for each unit type. The setting information for each unit type includes, for example, basis weight settings, a sheet type, a sheet attribute, fixing temperature settings, fixing pressure settings, primary transfer current value settings, secondary transfer current value settings, and pre transfer charger (PTC) current value settings. The basis weight settings are settings on a weight per sheet of one square meter. The sheet type is settings on a type of a sheet, and includes, for example, non-coated paper, gloss coated paper, matte coated paper, embossed paper, and the like. The sheet attribute is settings on an attribute of a sheet, and, for example, settings are made as to whether there is a front or a back of a sheet, or whether double-sided printing is not available. The fixing temperature settings are settings on a temperature generated by the fixing unit 15, when a toner image is fixed. The fixing pressure settings are settings on strength of pressure to be applied to a sheet by the fixing unit 15, when a toner image is fixed. The primary transfer current value settings are settings on magnitude of electric current for adhering toner on an intermediate transfer belt of the fixing unit 15, and settings are made for each color of black (Bk), cyan (C), magenta (M), and yellow (Y). The secondary transfer current value settings are settings on magnitude of electric current for adhering toner formed on the intermediate transfer belt to a sheet, and settings are made for each of a front and a back of a sheet. The PTC current value settings are settings on magnitude of electric current with which electric charges are applied to toner to be transferred.

The one or more controllers 29 are a functional part for controlling the entirety of the image forming apparatus 1. The one or more controllers 29 are configured of one or more control devices, or one or more control circuits, and, for example, are configured of a central processing unit (CPU), a system on a chip (SoC), or the like.

Further, the one or more controllers 29 can achieve each function by reading a program stored in the storage 23, and executing processing.

The cooling time estimator 31 estimates, based on a current temperature of the fixing unit 15 measured by the temperature sensor 17, a time until the temperature of the fixing unit 15 is lowered to a degree at which the fixing unit 15 can be removed from the image former 13.

The temperature monitor 33 monitors a current temperature of the fixing unit 15 measured by the temperature sensor 17 in real time.

1.2 Operation of Image Forming Apparatus 1 in Embodiment

Figure 2:
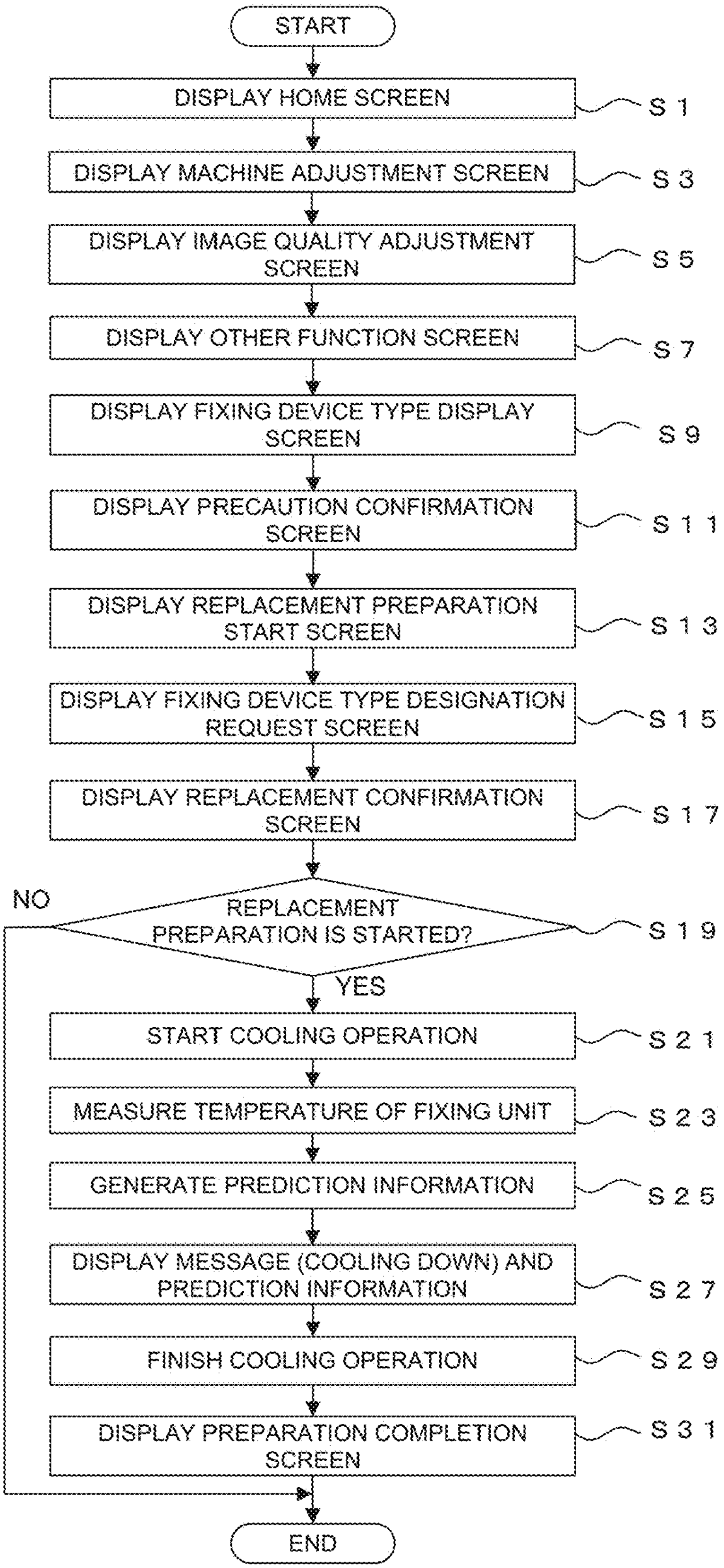
FIG. 2 is a flowchart for describing an operation of the image forming apparatus according to the embodiment of the present disclosure.

FIG. 2 is a flowchart for describing an operation of the image forming apparatus 1, when the fixing unit 15 is replaced. The image forming apparatus 1 is capable of mounting, to the image former 13, fixing units of three types (unit types A, B, and C), as the fixing unit 15. The unit type A is a fixing unit for A4/A3 size. The unit type B is a fixing unit for B5/B4 size. The unit type C is a fixing unit for an envelope size. Herein, a case where the unit type A mounted to the image former 13 is replaced by the unit type B is described as an example.

The one or more controllers 29 display a home screen on the display 3 (step S1). Next, the or more controllers 29 display a machine adjustment screen on the display 3 (step S3). Next, the one or more controllers 29 display an image quality adjustment screen on the display 3 (step S5). Next, the one or more controllers 29 display an other function screen on the display 3 (step S7). Next, the one or more controllers 29 display a fixing device type display screen before replacement on the display 3 (step S9). Next, the one or more controllers 29 display a precaution confirmation screen on the display 3 (step S11). Next, the one or more controllers 29 display a replacement preparation start screen on the display 3 (step S13). Next, the one or more controllers 29 display a fixing device type designation request screen on the display 3 (step S15). Next, the one or more controllers 29 display a replacement confirmation screen on the display 3 in order to confirm with the user whether to start replacement preparation of the fixing unit (step S17).

When an input as to replacement preparation is allowed to be started is accepted via the operation acceptor 5 on the replacement confirmation screen (Yes in step S19), the one or more controllers 29 display, on the display 3, a cooling-down screen indicating that a temperature of the currently mounted fixing unit 15 is waited to be lowered to a predetermined value, and also start a cooling operation of cooling the fixing unit 15 (step S21).

In the cooling operation of the fixing unit 15, the one or more controllers 29 stop electric power supply to the fixing unit 15. Further, in the cooling operation, the one or more controllers 29 promote lowering the temperature of the fixing unit 15 by activating the cooler 18.

With the start of the cooling operation, the temperature monitor 33 of the one or more controllers 29 measures a temperature of the fixing unit 15 or in the vicinity thereof by using the temperature sensor 17 (step S23). Thereafter, the temperature monitor 33 monitors the temperature of the fixing unit 15 until the cooling operation is finished by using the temperature sensor 17. Based on the measurement result of the temperature sensor 17, the cooling time estimator 31 of the one or more controllers 29 generates prediction information related to a cooling time (step S25). The prediction information is, for example, a required time predicted to be required until the temperature of the fixing unit 15 is lowered to a predetermined finishing temperature. Further, the prediction information is, for example, a time (scheduled finish time) when the temperature of the fixing unit 15 is predicted to be lowered to a finishing temperature. The finishing temperature is a temperature that is defined in advance as a temperature around which the user does not get burned or the like, even when the user directly touches the fixing unit 15, and is, for example, about 40 degrees.

Next, the one or more controllers 29 display the prediction information on the display 3 (step S27). At this occasion, a message indicating that the cooling operation is being performed may be displayed together with the prediction information. The user can know in advance an approximate time when the cooling operation is finished by viewing the displayed prediction information. Therefore, the user can leave the image forming apparatus 1 until the time indicated by the prediction information comes. Further, returning to the image forming apparatus 1 before the time indicated by the prediction information comes, and continuing the work allows the user to remove the mounted fixing unit 15 from the image former 13 without delay, and attach another fixing unit, after the temperature of the mounted fixing unit 15 is lowered to a replaceable temperature. Consequently, time required for the entirety of the replacement work of the fixing unit 15 including a cooling operation can be shortened to a minimum time.

Next, when the temperature monitored by the temperature monitor 33 reaches the finishing temperature, the one or more controllers 29 finish the cooling operation (step S29), and display a preparation completion screen on the display 3 (step S31). Viewing the preparation completion screen allows the user to confirm that the fixing unit 15 has actually reached the finishing temperature.

1.3 Screen Example of Image Forming Apparatus 1 in Embodiment

A screen example to be displayed on the display 3 when the fixing unit 15 is replaced is described. Herein, it is assumed that the display 3 and the operation acceptor 5 are integrally configured as a touch panel display.

Figure 3:
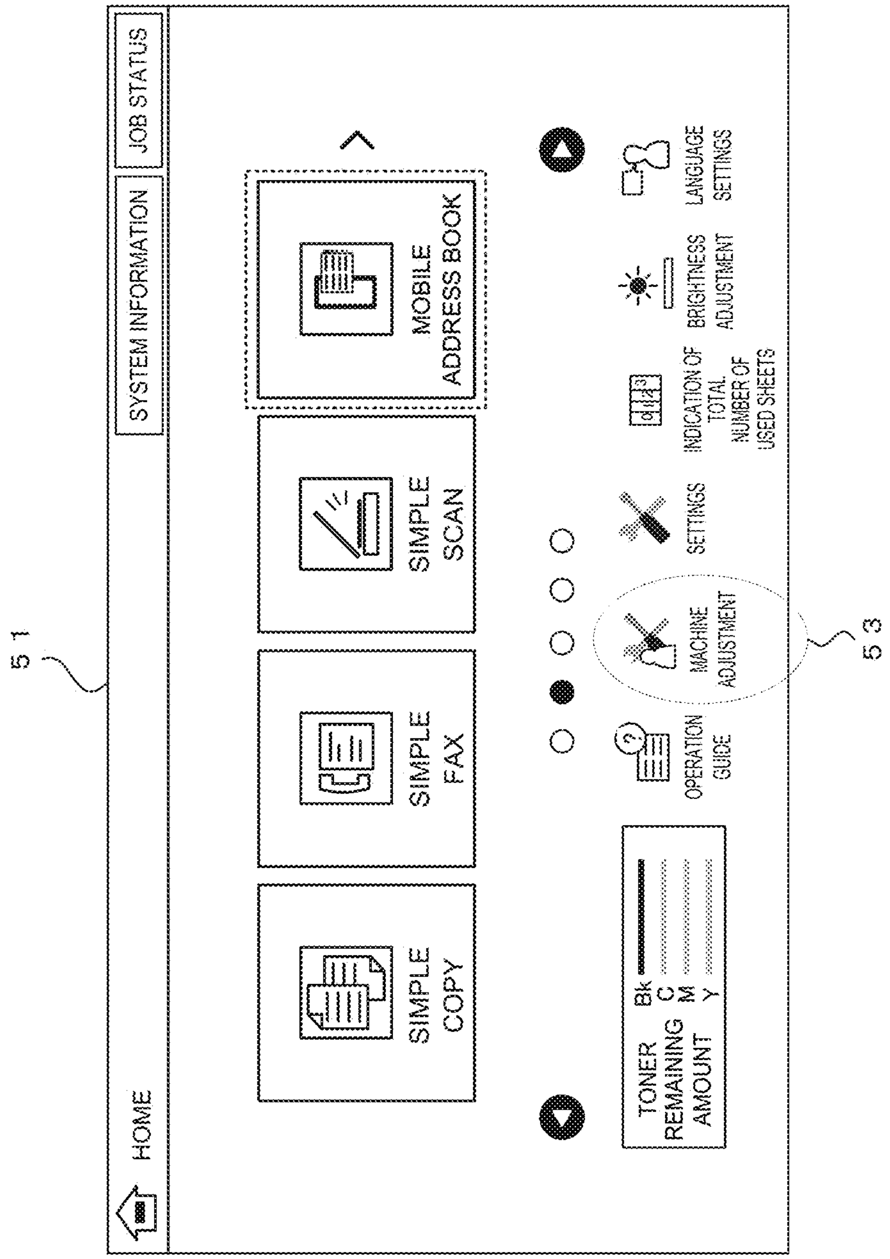
FIG. 3 is a diagram illustrating an example of a home screen to be displayed on a display of the image forming apparatus, when a fixing unit is replaced in the embodiment of the present disclosure.

FIG. 3 is a diagram illustrating an example of a home screen to be displayed on the display 3 of the image forming apparatus 1, when the fixing unit 15 is replaced in the embodiment of the present disclosure. A home screen 51 is a screen to be displayed on the display 3 by the one or more controllers 29, after the main power of the image forming apparatus 1 is turned on from an off-state. The home screen 51 includes a machine adjustment button 53. The one or more controllers 29 display, for example, the home screen 51 on the display 3 in step S1. When the user touches the machine adjustment button 53, the one or more controllers 29 display a machine adjustment screen 55 to be described next.

Figure 4:
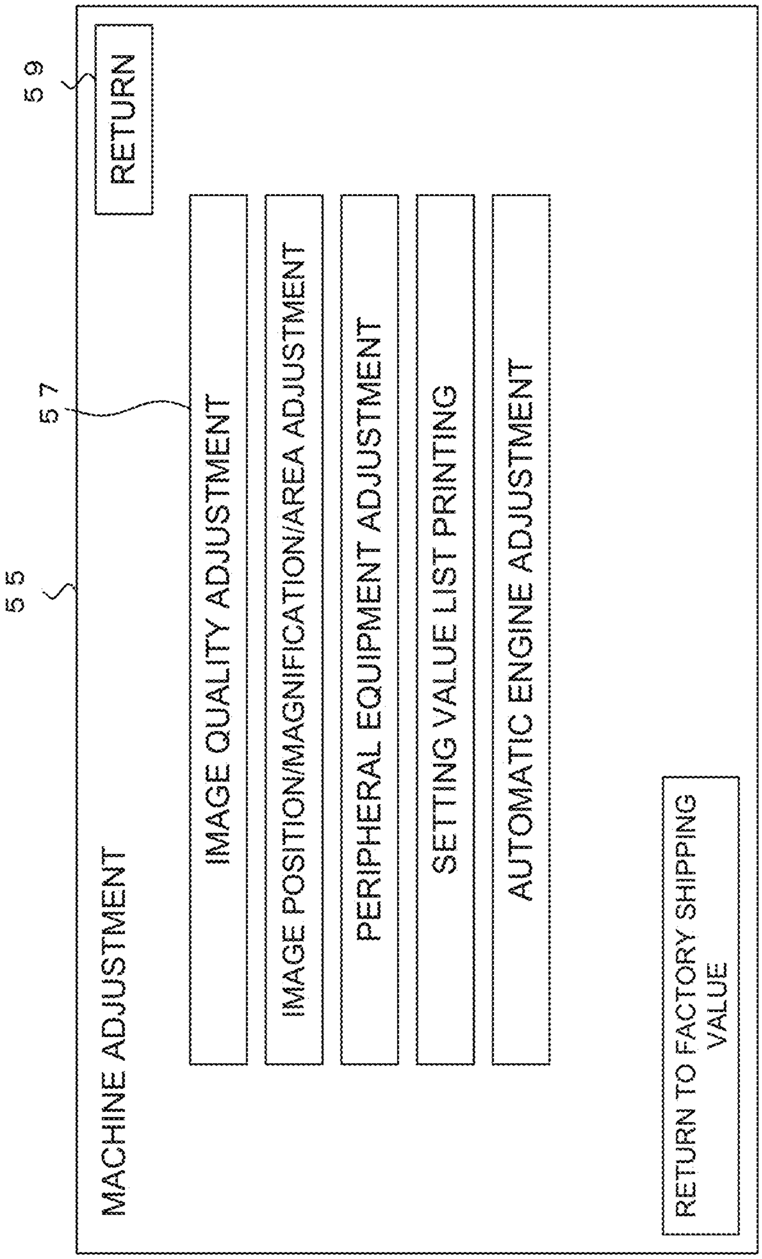
FIG. 4 is a diagram illustrating an example of a machine adjustment screen to be displayed on the display of the image forming apparatus, when the fixing unit is replaced in the embodiment of the present disclosure.

FIG. 4 is a diagram illustrating an example of a machine adjustment screen to be displayed on the display 3 of the image forming apparatus 1, when the fixing unit 15 is replaced in the embodiment of the present disclosure. In step S1, when the user touches the machine adjustment button 53 when the home screen 51 is displayed on the display 3, the one or more controllers 29 proceed to step S3, and display the machine adjustment screen 55 on the display 3. The machine adjustment screen 55 is a menu screen related to various pieces of adjustment work of the image forming apparatus 1. The machine adjustment screen 55 includes an image quality adjustment button 57. The image quality adjustment button 57 is an area to be touched, when the control proceeds to an image quality adjustment screen to be described next.

Figure 5:
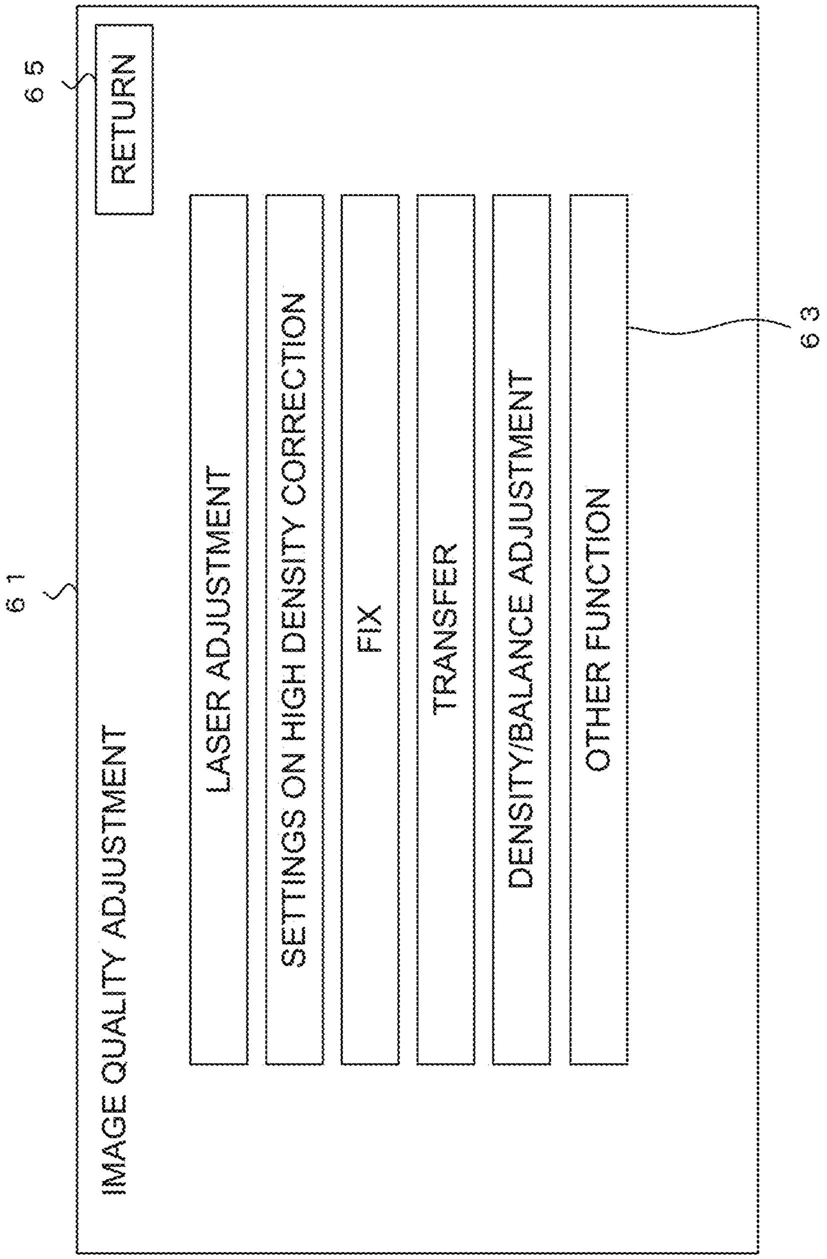
FIG. 5 is a diagram illustrating an example of an image quality adjustment screen to be displayed on the display of the image forming apparatus, when the fixing unit is replaced in the embodiment of the present disclosure.

FIG. 5 is a diagram illustrating an example of an image quality adjustment screen to be displayed on the display 3 of the image forming apparatus 1, when the fixing unit 15 is replaced in the embodiment of the present disclosure. In step S3, when the user touches the image quality adjustment button 57 when the machine adjustment screen 55 is displayed on the display 3, the one or more controllers 29 proceed to step S5, and display an image quality adjustment screen 61 on the display 3. The image quality adjustment screen 61 is a menu screen related to image quality adjustment of an image to be formed on a sheet by the image former 13. The image quality adjustment screen 61 includes an other function button 63. The other function button 63 is an area to be touched, when the control proceeds to an other function screen 67 to be described next.

Figure 6:
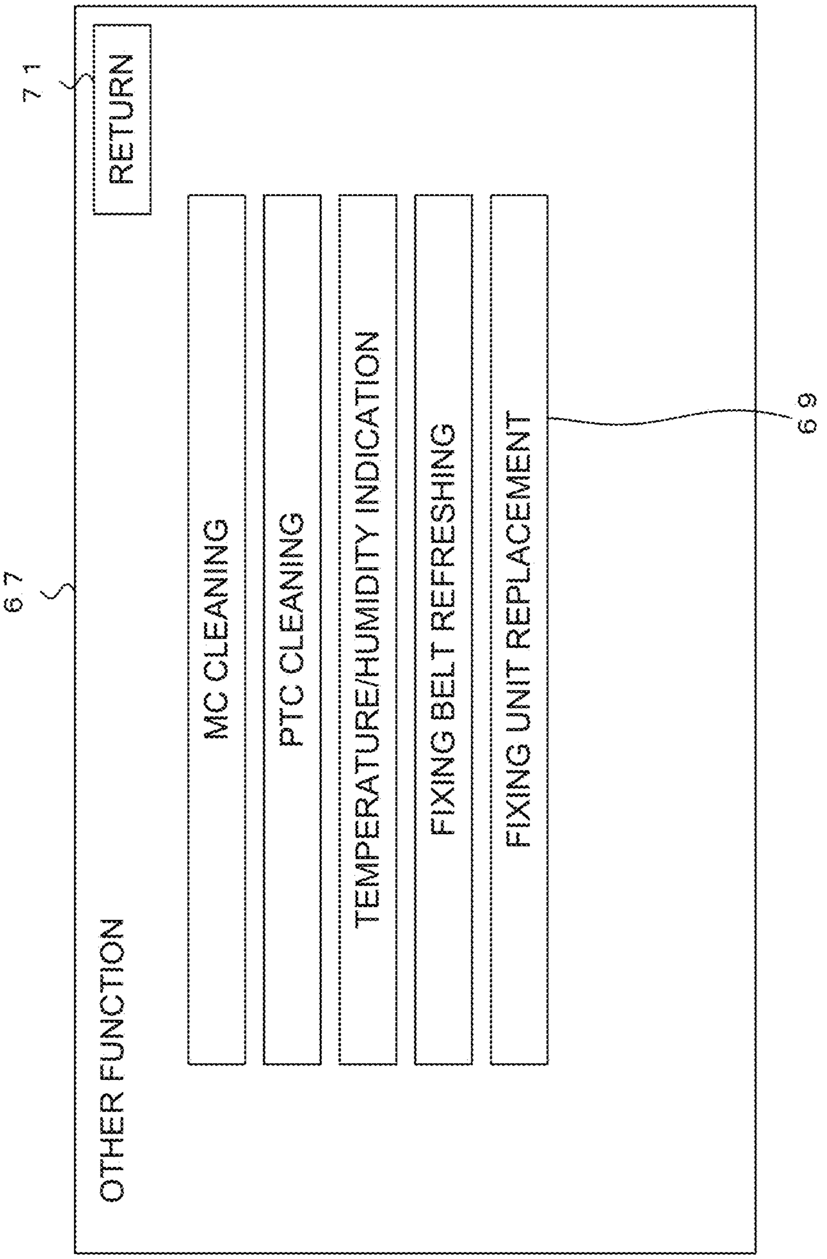
FIG. 6 is a diagram illustrating an example of an other function screen to be displayed on the display of the image forming apparatus, when the fixing unit is replaced in the embodiment of the present disclosure.

FIG. 6 is a diagram illustrating an example of an other function screen to be displayed on the display 3 of the image forming apparatus 1, when the fixing unit 15 is replaced in the embodiment of the present disclosure. In step S5, when the user touches the other function button 63 when the image quality adjustment screen 61 is displayed on the display 3, the one or more controllers 29 proceed to step S7, and display the other function screen 67 on the display 3. The other function screen 67 is a menu screen related to image quality adjustment of an image to be formed on a sheet by the image former 13. The other function screen 67 includes a fixing unit replacement button 69. The fixing unit replacement button 69 is an area to be touched, when the control proceeds to a fixing device type display screen 73 to be described next.

Figure 7:
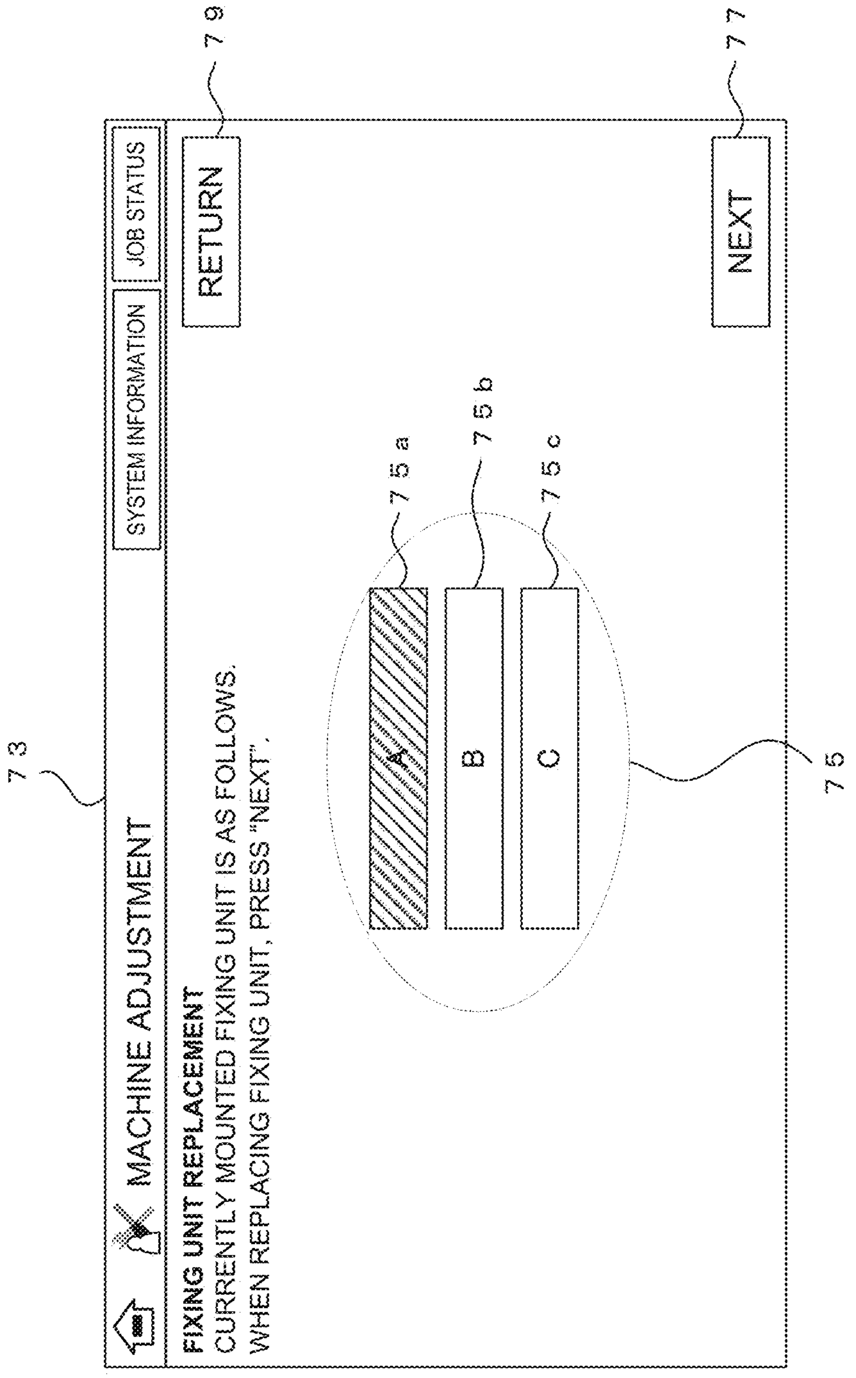
FIG. 7 is a diagram illustrating a fixing device type display screen to be displayed on the display of the image forming apparatus, when the fixing unit is replaced in the embodiment of the present disclosure.

FIG. 7 is a diagram illustrating an example of a fixing device type display screen to be displayed on the display 3 of the image forming apparatus 1, when the fixing unit 15 is replaced in the embodiment of the present disclosure. In step S7, when the user touches the fixing unit replacement button 69 when the other function screen 67 is displayed on the display 3, the one or more controllers 29 proceed to step S9, and display the fixing device type display screen 73 on the display 3.

The fixing device type display screen 73 is a screen on which a unit type of the fixing unit 15 currently mounted to the image forming apparatus 1 is displayed. The fixing device type display screen 73 includes a unit type list 75. Unit types A75*a*, B75*b*, and C75*c* are displayed in the unit type list 75.

Among these unit types, the one or more controllers 29 display, on the display 3 (e.g., reverse display or emphasis display), a unit type of the currently mounted fixing unit 15 in a selected state, based on a unit type stored in the attachment unit type storage 25. As described above, since the fixing unit 15 currently mounted to the image forming apparatus 1 is of the unit type A, the unit type A75*a* is displayed in a selected state. The unit type stored in the attachment unit type storage 25 is, for example, registered via the operation acceptor 5, when the user performs initial settings on the image forming apparatus 1. Thereafter, the unit type stored in the attachment unit type storage 25 is updated to a unit type designated on a fixing device type designation request screen in step S11 to be described later.

As described above, displaying a unit type of the currently mounted fixing unit 15 allows the user to easily recognize of which unit type, the currently mounted fixing unit 15 is. Further, this enables to prevent that the user replaces to a fixing unit 15 of another unit type by mistake.

When it is determined that it is not necessary to change the unit type of the fixing unit 15 at this time of confirmation, the user can cancel replacement of the fixing unit by touching a return button 79. When the fixing unit is replaced even after this confirmation, the user touches a next button 77. When the next button 77 is touched, the one or more controllers 29 proceed to step S7.

Figure 8:
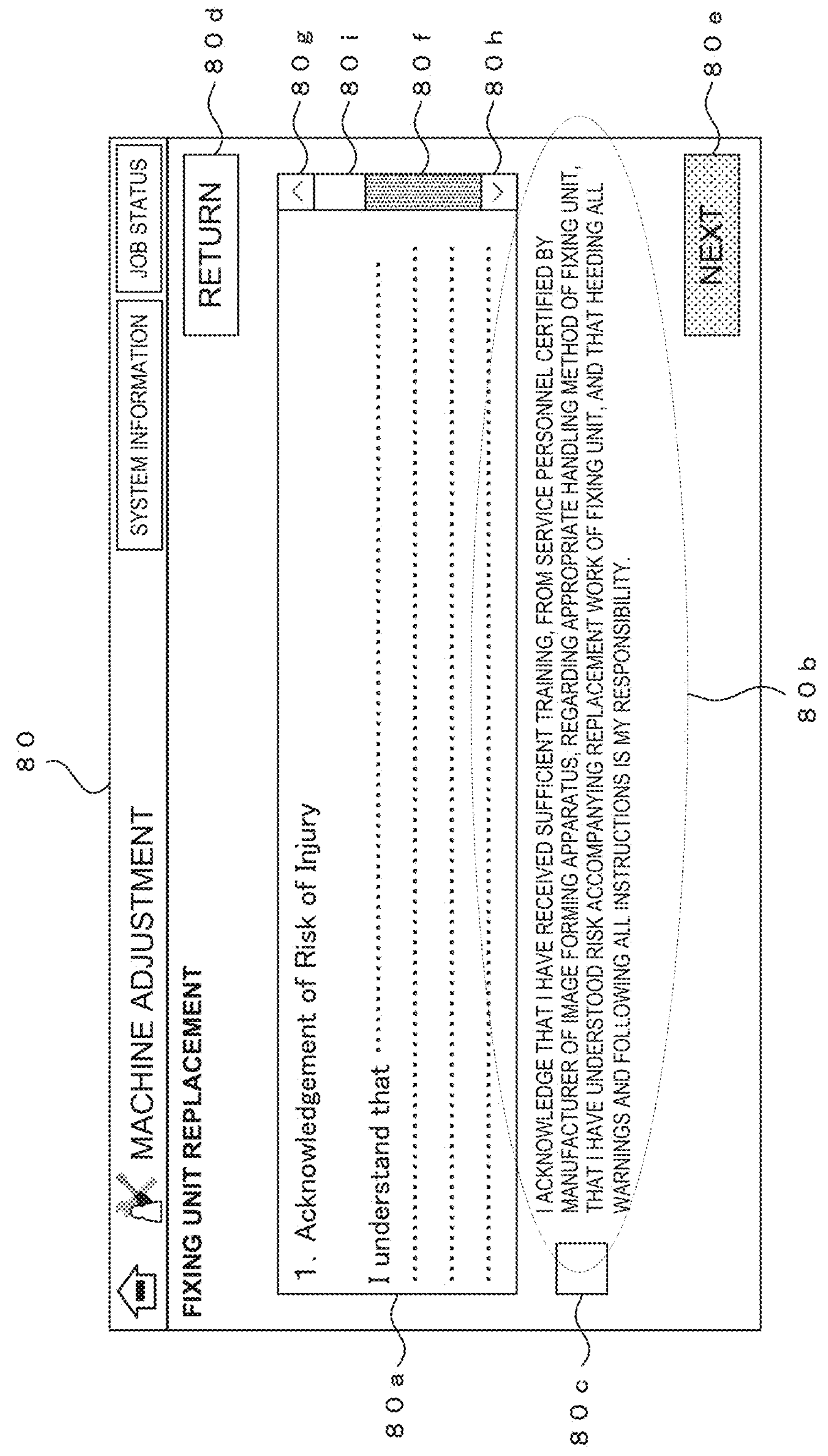
FIG. 8 is a diagram illustrating an example of a precaution confirmation screen to be displayed on the display of the image forming apparatus, when the fixing unit is replaced in the embodiment of the present disclosure.

FIG. 8 is a diagram illustrating an example of a precaution confirmation screen to be displayed on the display 3 of the image forming apparatus 1, when the fixing unit 15 is replaced in the embodiment of the present disclosure. In step S9, when the user touches the next button 77 when the fixing device type display screen 73 is displayed on the display 3, the one or more controllers 29 proceed to step S10, and display a precaution confirmation screen 80 on the display 3.

The precaution confirmation screen 80 is a screen for notifying the user who performs replacement work of the fixing unit 15 of various precautions related to the replacement work before the replacement work, and also requesting the user to confirm the notification. The precaution confirmation screen 80 includes a precaution display field 80*a*, an affidavit display field 80*b*, a check field 80*c*, a return button 80*d*, a next button 80*e*, and a scroll bar 80*f*.

The precaution display field 80*a* displays a message addressed to the user who performs replacement work. The message in the precaution display field 80*a* may be a list of precautions regarding replacement work. In addition to or instead of a message as described above, a message in the precaution display field 80*a* may be the one that informs the user who performs replacement work of a risk of injury, burns, or the like during the replacement work. Note that, the entirety of the message may not be displayed at once in the precaution display field 80*a*. The message to be displayed in the precaution display field 80*a* is scrolled up and down in response to an operation of the scroll bar 80*f* via the operation acceptor 5. In the precaution display field 80*a*, the entirety of the message can be browsed by scrolling.

A message for the user who performs replacement work to express that the user has received sufficient training for an appropriate handling method of the fixing unit before the replacement work, that the user has understood a risk involved in the replacement work, and the like is written in the affidavit display field 80*b*. When the user agrees to the message in the affidavit display field 80*b*, the user checks the check field 80*c* via the operation acceptor 5. The check field 80*c* is not checked on the precaution confirmation screen 80. When the check field 80*c* is not checked, the next button 80*e* is grayed out. The gray-out display indicates that the next button 80*e* is currently in a non-selectable state.

The scroll bar 80*f* includes an up arrow button 80*g*, a down arrow button 80*h*, and a knob 80*i*. The scroll bar 80*f* is operated by the user via the operation acceptor 5 to scroll a message displayed in the precaution display field 80*a*. When the up arrow button 80*g* is touched via the operation acceptor 5, the message displayed in the precaution display field 80*a* is allowed to be scrolled upward. Likewise, when the down arrow button 80*h* is touched, the message is allowed to be scrolled downward. Instead of touching the up arrow button 80*g* or the down arrow button 80*h*, the user is allowed to scroll the message displayed in the precaution display field 80*a* up and down by moving the knob 80*i* up and down, while touching the knob 80*i* via the operation acceptor 5.

Figure 9:
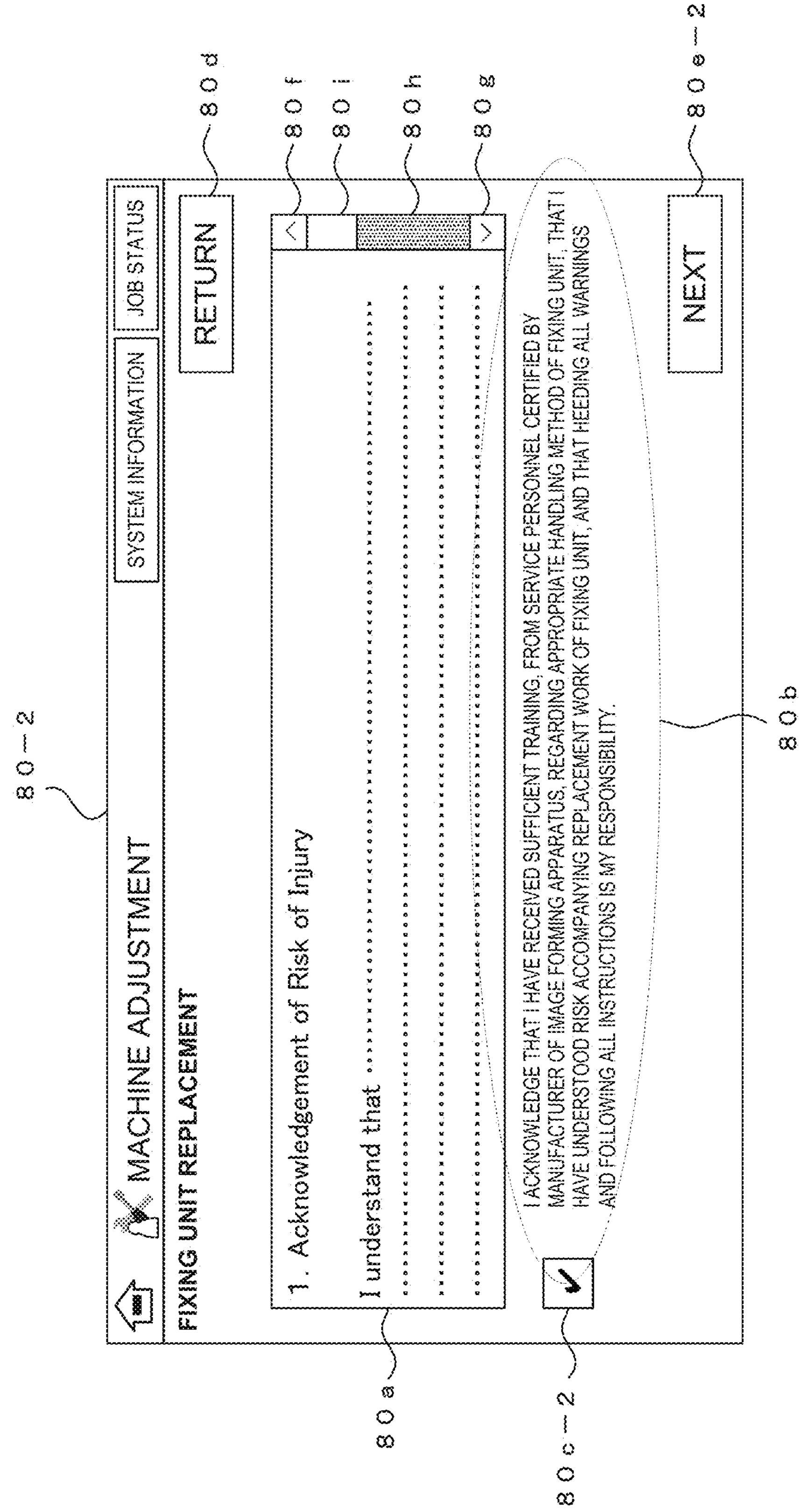
FIG. 9 is a diagram illustrating an example of a precaution confirmation screen to be displayed on the display of the image forming apparatus, when the fixing unit is replaced in the embodiment of the present disclosure.

On the precaution confirmation screen 80, when an operation of checking the check field 80*c* is performed via the operation acceptor 5, the one or more controllers 29 shift a screen to be displayed on the display 3 from the precaution confirmation screen 80 to a precaution confirmation screen 80-2 illustrated in FIG. 9. FIG. 9 is another example of the precaution confirmation screen to be displayed on the display 3 of the image forming apparatus 1, when the fixing unit 15 is replaced in the embodiment of the present disclosure. The check field 80*c*, which is blank on the precaution confirmation screen 80, is checked, and the check field 80*c* is changed to a checked check field 80*c*-2 on the precaution confirmation screen 80-2. Further, in response to the checked check field 80*c*-2, the next button 80*e*, which is grayed out on the precaution confirmation screen 80, shifts to a normal display state as exemplified by a next button 80*e*-2 on the precaution confirmation screen 80-2, and indicates that the screen is in a selectable state.

Figure 10:
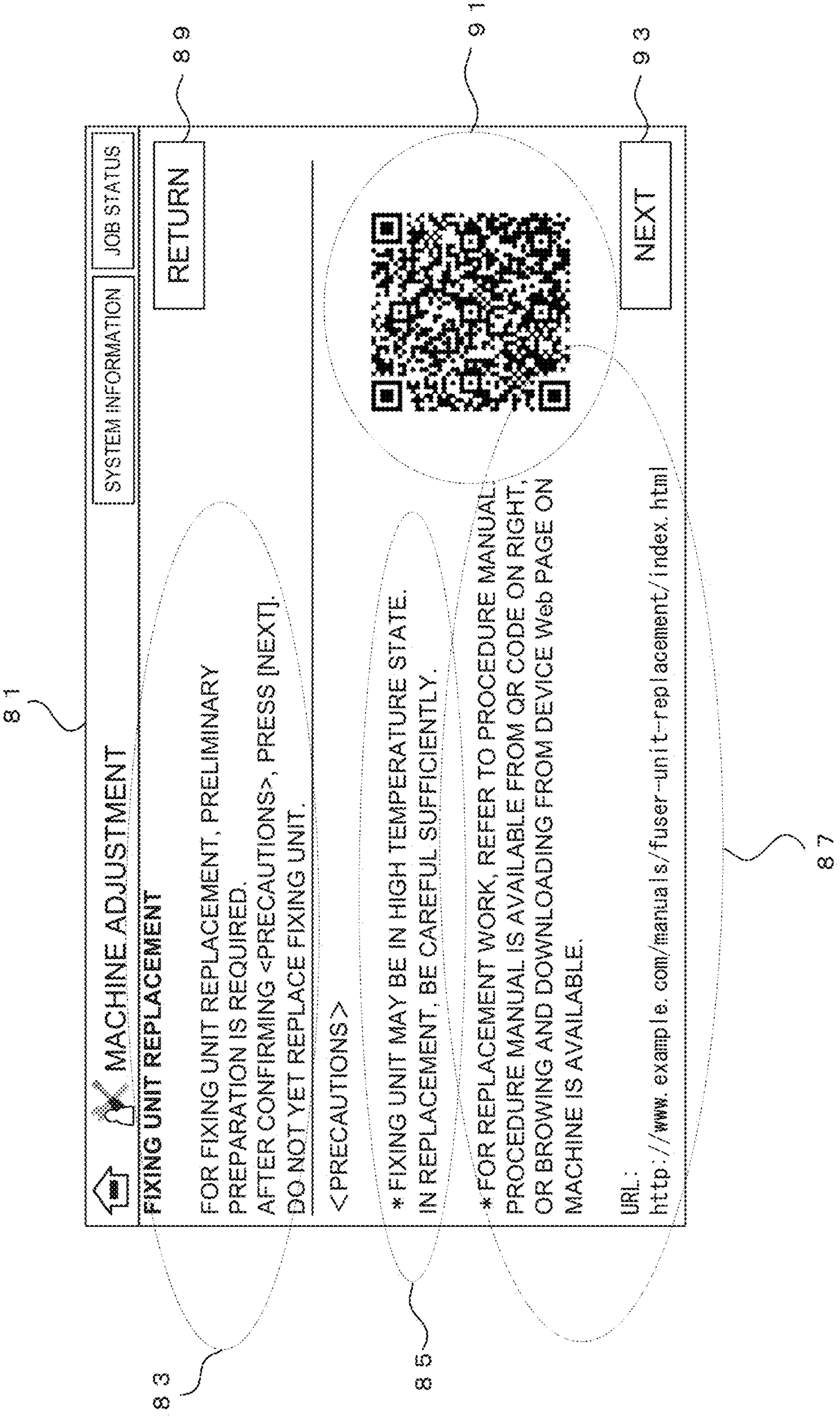
FIG. 10 is a diagram illustrating an example of a replacement preparation start screen to be displayed on the display of the image forming apparatus, when the fixing unit is replaced in the embodiment of the present disclosure.

FIG. 10 is a diagram illustrating an example of a replacement preparation start screen to be displayed on the display 3 of the image forming apparatus 1, when the fixing unit is replaced in the embodiment of the present disclosure. In step S13, the one or more controllers 29 display a replacement preparation start screen 81 on the display 3. The replacement preparation start screen 81 includes message 83, 85, and 87, a return button 89, a two-dimensional barcode 91, and a next button 93.

The message 83 is a message for notifying the user that preliminary preparation is necessary before the fixing unit is replaced. The preliminary preparation includes the above-described cooling operation.

The message 85 is a message for informing the user that the fixing unit is in a high temperature state. In particular, immediately after the image forming apparatus 1 outputs a medium on which an image is formed, a fixing member of the fixing unit 15 is at a high temperature (e.g., 160 to 180 degrees). The message 85 prompts the user not to directly touch the fixing unit 15 in a high-temperature state as described above.

The message 87 notifies the user of information for accessing to a procedure manual of replacement work. Address information of data on a procedure manual downloadable by a device other than the image forming apparatus 1 is written in the message 87. Specifically, the device other than the image forming apparatus 1 is, for example, a smartphone, a tablet terminal, a personal computer, or the like (hereinafter, referred to as a user terminal) of the user who performs replacement work of a fixing unit. Performing work while reading the procedure manual on a user terminal allows even a user who does not have knowledge on a fixing device or a replacement procedure to perform the replacement work safely.

Normally, a current state of the image forming apparatus 1, a command with which an instruction or settings are actually enabled for the image forming apparatus 1, various numerical values, and the like are displayed on the display 3 of the image forming apparatus 1. Since a display size of the display 3 is limited, it is difficult to simultaneously display these indications and the procedure manual. There is an idea of switching these indications and display of the procedure manual as necessary. However, in this case, the operation is likely to become cumbersome. Displaying the procedure manual on a user terminal enables to avoid a problem as described above.

Further, as will be described later, replacement work of a fixing unit includes a step of turning on and off the main power of the image forming apparatus 1. Therefore, when the procedure manual is displayed on the display 3 of the image forming apparatus 1, a time during which the procedure manual cannot be confirmed may be generated during the work. However, since the user who reads the message 87 can download the procedure manual to the user terminal, the user can confirm the procedure manual irrespective of an on/off state of the power of the image forming apparatus 1.

In the message 87, a uniform resource locator (URL) on the Internet is written as address information. However, the address information to be written herein is not limited to address information of a resource on the Internet, and may be address information of a resource that can be accessed from the user terminal, and from which data on the procedure manual can be downloaded. For example, in a case where both the user terminal and the image forming apparatus 1 can be connected to the same local area network (LAN), the procedure manual may be stored in the storage 23 of the image forming apparatus 1, and the one or more controllers 29 may operate as a file server, and provide data on the procedure manual to the user terminal via the LAN. Further, a Bluetooth communication function may be provided in the communicator 19 and/or the connector 21, and a file may be shared with a user terminal also having the Bluetooth communication function to thereby allow the user terminal to download the procedure manual data from the image forming apparatus 1 via the Bluetooth communication function.

Note that, in place of displaying the procedure manual on a user terminal, the procedure manual may be displayed on the display 3 of the image forming apparatus 1. In this case, as described above, although the procedure manual cannot be confirmed during a time when the main power of the image forming apparatus 1 is turned on and off, it is not necessary to prepare a user terminal separately.

The two-dimensional barcode 91 is the one in which address information of procedure manual data is displayed as a two-dimensional barcode. The address information indicated by the two-dimensional barcode 91 may be the same address as the address information written in the message 87, or may be an address other than the above.

When the user touches the return button 89, the one or more controllers 29 display, on the display 3, the fixing device type display screen 73. When the user touches the next button 93, the one or more controllers 29 proceed to next step S15.

Figure 11:
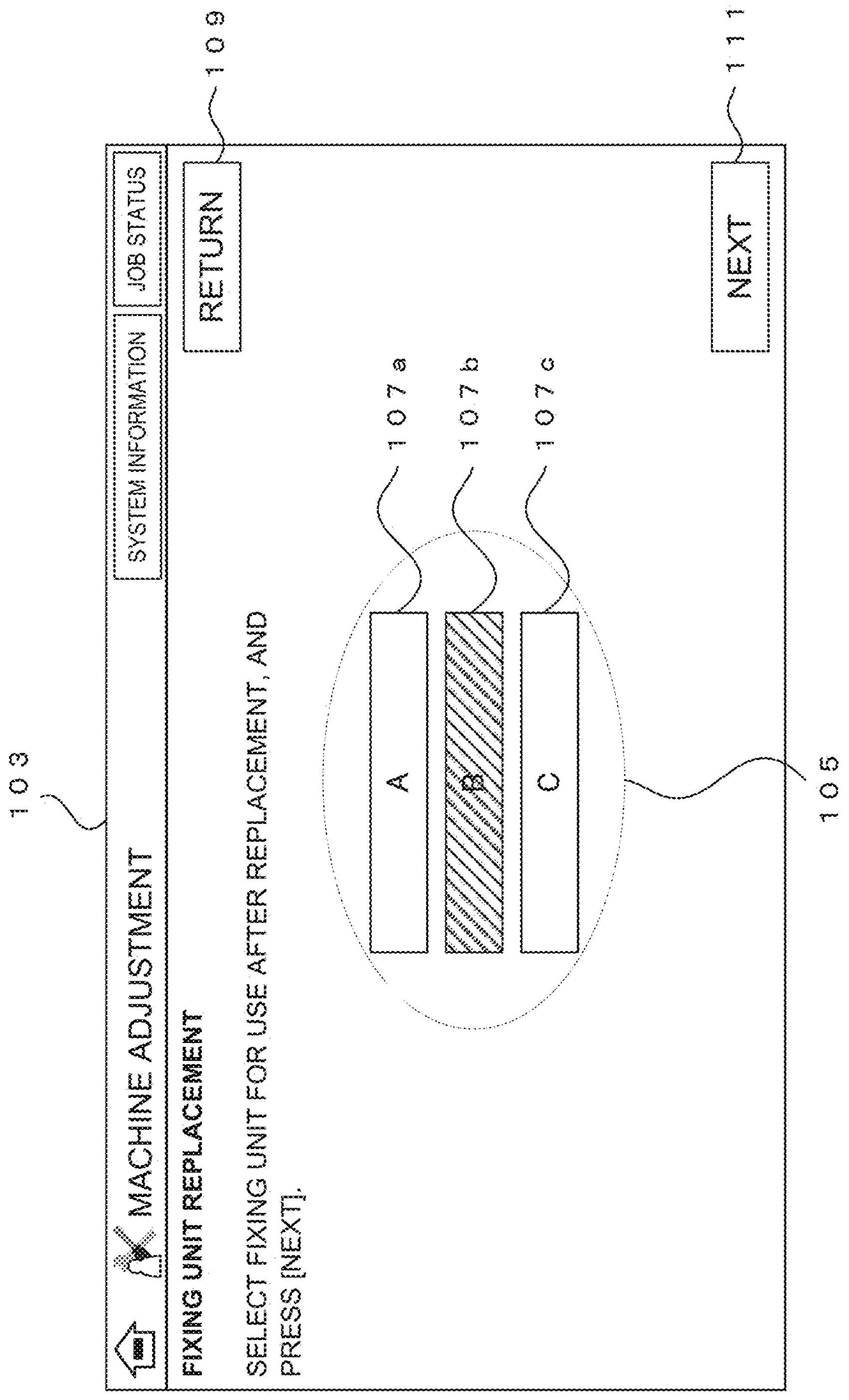
FIG. 11 is a diagram illustrating an example of a fixing device type designation request screen to be displayed on the display of the image forming apparatus, when the fixing unit is replaced in the embodiment of the present disclosure.

FIG. 11 is a diagram illustrating an example of a fixing device type designation request screen to be displayed on the display 3 of the image forming apparatus 1, when the fixing unit 15 is replaced in the embodiment of the present disclosure. A fixing device type designation request screen 103 is in a state after the user touches the unit type B107*b*, and the fixing unit is selected. Therefore, the unit type B107*b* is displayed in a selected state on the fixing device type designation request screen 103.

When the user touches a next button 111 on the fixing device type designation request screen 103, the one or more controllers 29 proceed to next step S17 by assuming that a unit type in a selected state at this occasion, specifically, the unit type B is selected. Further, at this occasion the one or more controllers 29 update the unit type stored in the attachment unit type storage 25 to the selected unit type. When the next button 111 is touched on the fixing device type designation request screen 103, the one or more controllers 29 update the unit type stored in the attachment unit type storage 25 to the unit type B.

Requesting the user for an input of a unit type of a fixing unit after replacement, as exemplified on the fixing device type designation request screen 103 enables to prevent that the fixing unit is replaced with a fixing device of another unit type by mistake.

Figure 12:
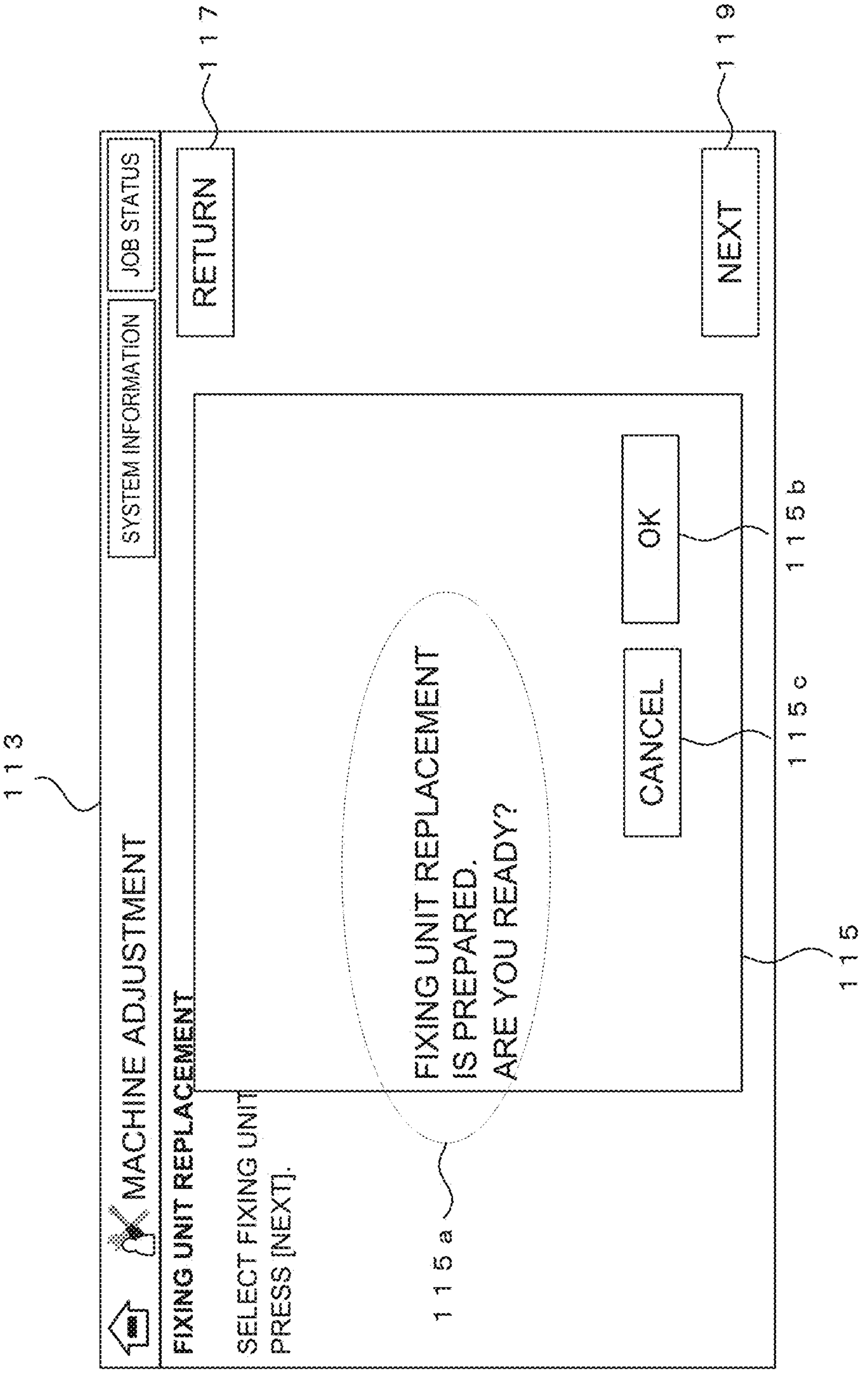
FIG. 12 is a diagram illustrating an example of a replacement confirmation screen to be displayed on the display of the image forming apparatus, when the fixing unit is replaced in the embodiment of the present disclosure.

FIG. 12 is a diagram illustrating an example of a replacement confirmation screen to be displayed on the display 3 of the image forming apparatus 1, when the fixing unit 15 is replaced in the embodiment of the present disclosure. A replacement confirmation screen 113 includes a message area 115. A message 115*a* of confirming the user that the image forming apparatus 1 enters preparation for replacing the fixing unit 15 is displayed in the message area 115. Further, the message area 115 includes an OK button 115*b* and a cancel button 115*c*. When the OK button 115*b* is touched (Yes in step S19), the one or more controllers 29 proceed to step S21, and start a cooling operation. When the cancel button 115*c* is touched (NO in step S19), the one or more controllers 29 stop (finish) the processing.

Figure 13:
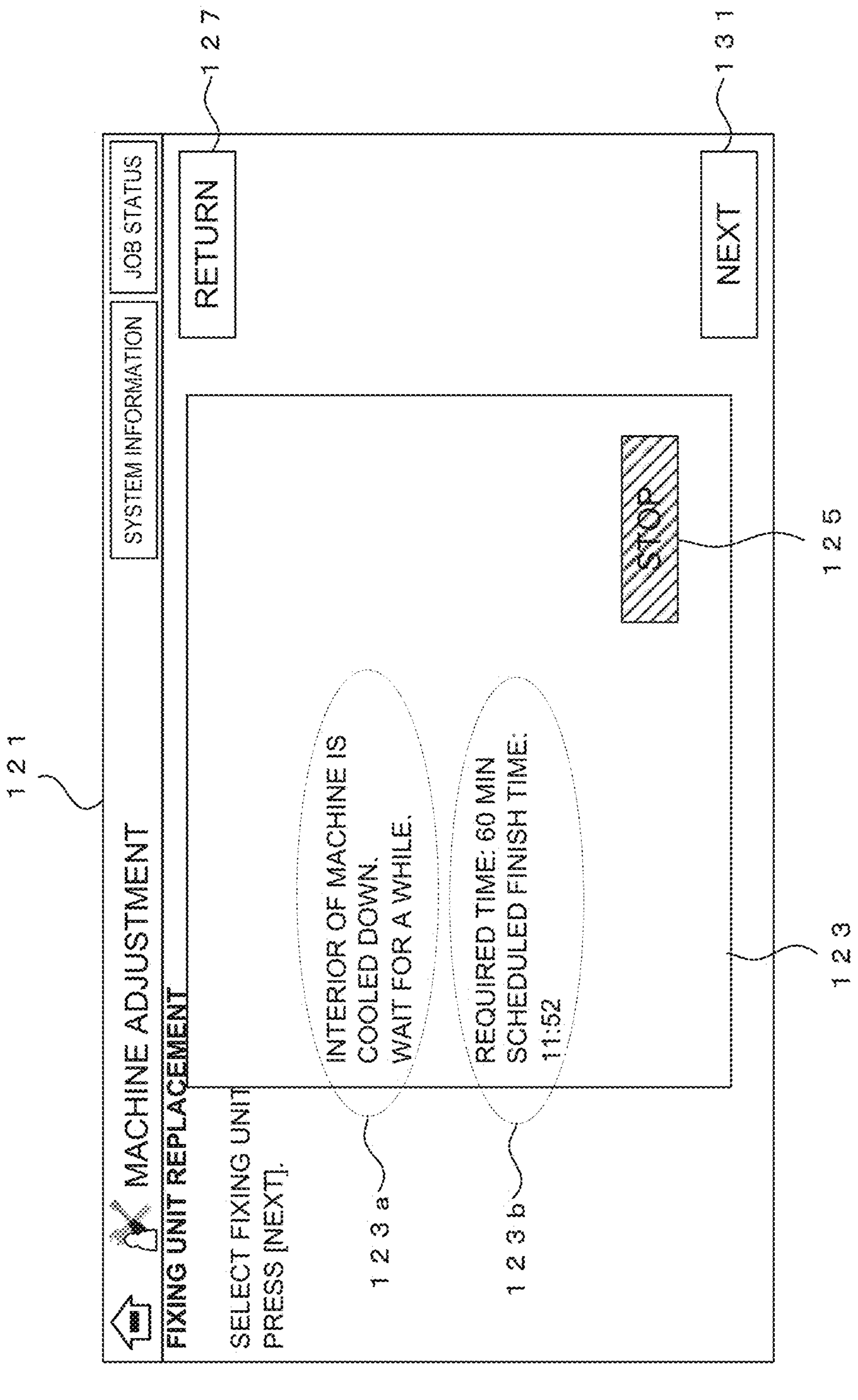
FIG. 13 is a diagram illustrating an example of a cooling-down screen to be displayed on the display of the image forming apparatus, when the fixing unit is replaced in the embodiment of the present disclosure.

FIG. 13 is a diagram illustrating an example of a cooling-down screen to be displayed on the display 3 of the image forming apparatus 1, when the fixing unit 15 is replaced in the embodiment of the present disclosure. In step S21, the one or more controllers 29 start a cooling operation, cause the temperature monitor 33 to measure a temperature of the fixing unit 15 by the temperature sensor 17 (step S23), generate prediction information, based on the measurement result (step S25), and display a cooling-down screen 121 on the display 3 (step S27).

The cooling-down screen 121 includes a message area 123. A message 123*a* of informing the user that the user is requested to wait until the temperature of the fixing unit 15 falls down, prediction information 123*b*, and a stop button 125 are displayed in the message area 123.

A required time and a scheduled finish time are written in the prediction information 123*b*. The time "60 minutes" written as the required time is a value computed by the cooling time estimator 31 of the one or more controllers 29, based on a current temperature of the fixing unit 15, which is measured by the temperature sensor 17. The time "11:52" written as the scheduled finish time indicates a time after the required time has elapsed from the current time. Viewing the required time allows the user to know the required time of the cooling operation. Further, viewing the scheduled finish time allows the user to know when the replacement work of the fixing unit to be performed after the cooling operation is finished can be started.

In step S23 and thereafter, the temperature monitor 33 periodically measures a temperature of the fixing unit 15 by using the temperature sensors 17, and compares the measured temperature with a finishing temperature. When the temperature of the fixing unit 15 reaches the finishing temperature or lower without the stop button 125 being touched, the one or more controllers 29 finish the cooling operation (step S29), and proceed to step S31.

Figure 14:
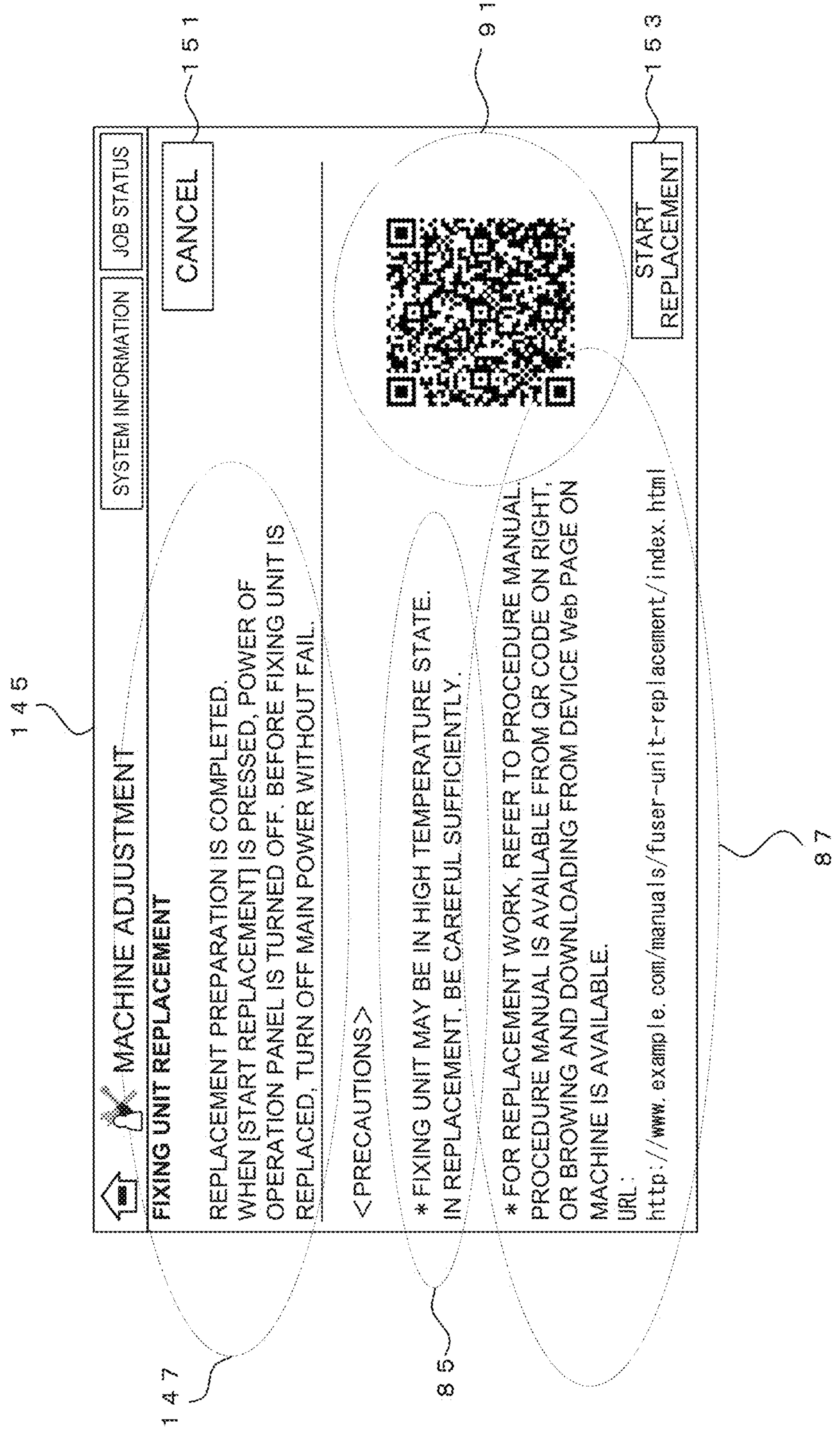
FIG. 14 is a diagram illustrating an example of a preparation completion screen to be displayed on the display of the image forming apparatus, when the fixing unit is replaced in the embodiment of the present disclosure.

FIG. 14 is a diagram illustrating an example of a preparation completion screen to be displayed on the display 3 of the image forming apparatus 1, when the fixing unit 15 is replaced in the embodiment of the present disclosure. The one or more controllers 29 display a preparation completion screen 145 in step S31. The preparation completion screen 145 includes a message 147, the messages 85 and 87, a cancel button 151, the two-dimensional barcode 91, and a replacement start button 153.

The message 147 includes a message of notifying the user that a temperature of the fixing unit 15 has reached the finishing temperature, and the image forming apparatus 1 is in a state ready for replacement work. Further, the message 147 includes a message of notifying the user that, when the replacement start button 153 is touched, power of an operation panel (the display 3 and the operation acceptor 5) is turned off, and the image forming apparatus 1 is shifted to a stand-by state. Further, the message 147 includes a message of instructing the user to turn off the main power switch 7, and turn off the power of the image forming apparatus 1, after the image forming apparatus 1 is shifted to a stand-by state.

The cancel button 151 is a button for instructing the image forming apparatus 1 to stop replacement of the fixing unit 15.

The replacement start button 153 is a button for finally instructing the image forming apparatus 1 to replace the fixing unit 15. Since the messages 85 and 87, and the two-dimensional barcode 91 have already been described with reference to FIG. 10, description thereof is omitted herein.

When the preparation completion screen 145 is displayed, and the replacement start button 153 is touched, the power of the operation panel is turned off. Thereafter, the user turns off the main power switch 7 of the image forming apparatus 1, removes the fixing unit 15 of the unit type A from the image former 13, and mounts the fixing unit of the unit type B to the image former 13. After the mounting, the main power switch 7 is turned on, whereby image formation using the fixing unit of the unit type B is enabled.

1.4 Advantageous Effect of Embodiment

The following advantageous effects are provided according to the embodiment.

In step S9, since the fixing device type display screen 73 is displayed, the user can confirm the unit type of the currently mounted fixing unit 15 before replacement.

In step S15, since the fixing device type designation request screen 103 is displayed, and the user is requested to input a unit type, it is possible to prompt the user to securely recognize the unit type after the replacement. Thus, it is possible to prevent the fixing unit 15 from being replaced with a fixing unit of a wrong unit type.

In step S13, since information for accessing to a procedure manual of replacement work is notified to the user, as the message 87 on the replacement preparation start screen 81, the user can perform the replacement work of the fixing unit 15, while viewing a user terminal. Therefore, even a user who is not well versed in a structure of the image forming apparatus 1, or details on replacement work of the fixing unit 15 can safely perform the replacement work. Further, since the procedure manual can be browsed on the user terminal, the user can browse the procedure manual irrespective of on/off of the power of the image forming apparatus 1.

In step 27, a required time until the cooling operation of cooling the fixing unit 15 is finished, and a scheduled finish time are displayed. The user who views the above can know the time when the cooling operation is finished, and the user can touch the fixing unit. Therefore, after the cooling operation is started, the user can leave the image forming apparatus 1, and perform another work or the like until the scheduled finish time. Further, when the user returns to the image forming apparatus 1 before the scheduled finish time, the user can remove the mounted fixing unit 15 from the image former 13, and replace the fixing unit 15 with another fixing unit without delay after the cooling operation is finished.

1.5 Modification of Embodiment 1.5.1 Modification 1

In the above-described embodiment, in steps S21 to S25, prediction information generated together with start of a cooling operation is displayed without being updated until the cooling operation is finished in step S29.

Figure 15:
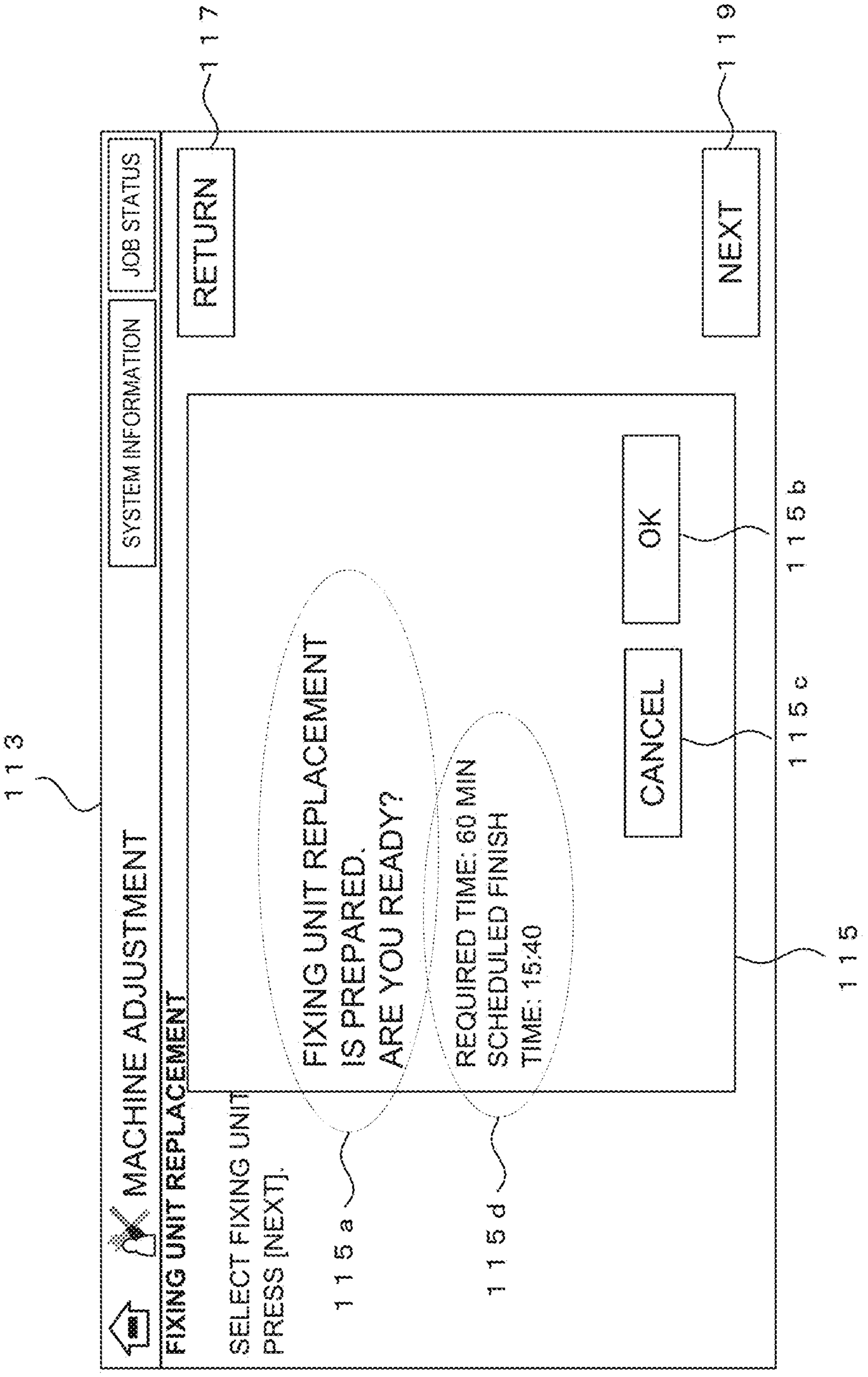
FIG. 15 is a diagram illustrating an example of a replacement confirmation screen to be displayed on the display of the image forming apparatus, when the fixing unit is replaced in modification 1 of the embodiment of the present disclosure.
Figure 16:
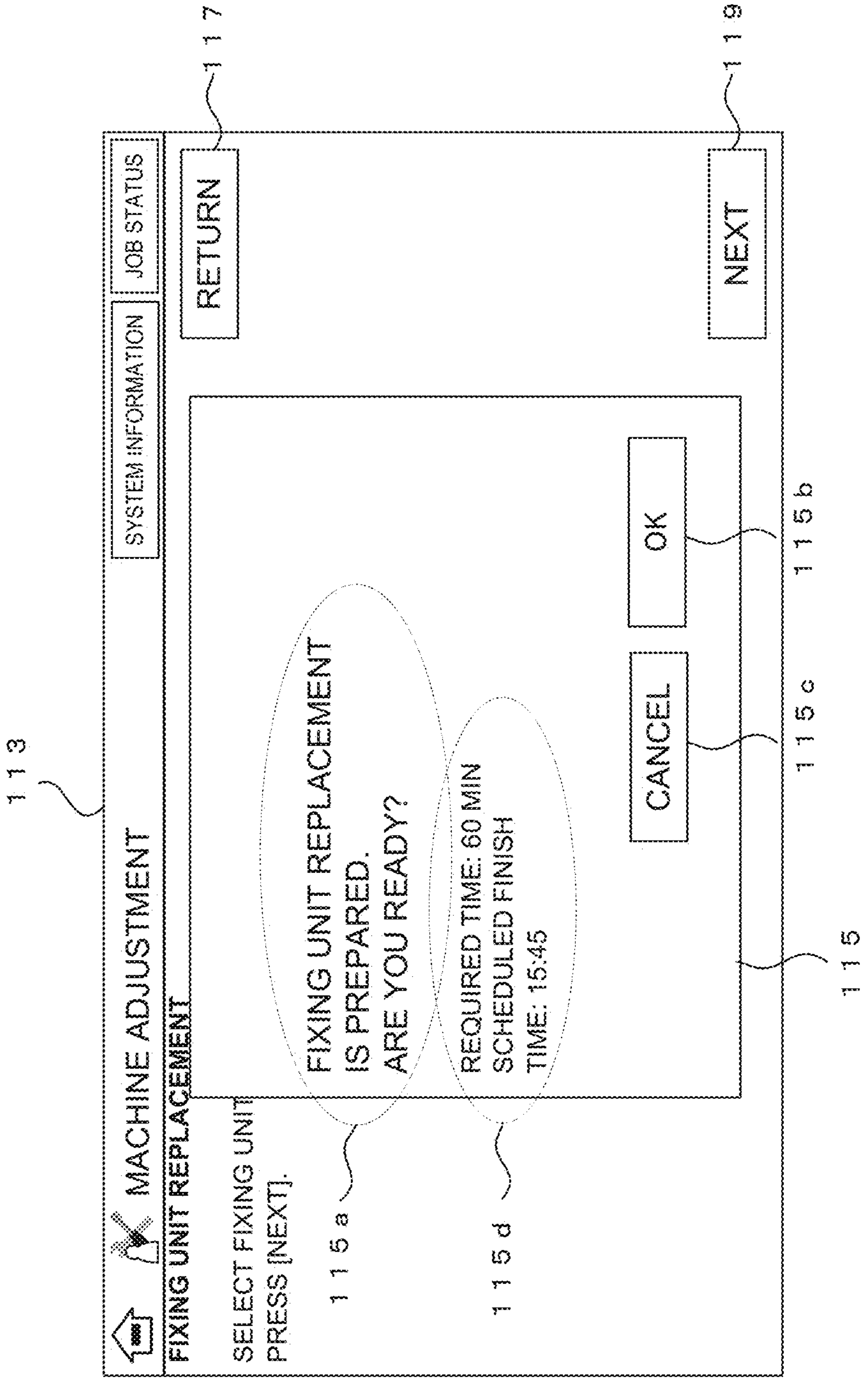
FIG. 16 is a diagram illustrating an example of a replacement confirmation screen to be displayed on the display of the image forming apparatus, when the fixing unit is replaced in the modification 1 of the embodiment of the present disclosure.

In the present modification, after the replacement confirmation screen 113 is displayed, the scheduled finish time is updated according to an elapse of time. For example, after the replacement confirmation screen 113 in FIG. 15 is displayed immediately after start of a cooling operation, the temperature monitor 33 measures a temperature of the fixing unit 15 every minute, generates a scheduled finish time, and updates a value of the scheduled finish time on the replacement confirmation screen 113. FIG. 16 illustrates a replacement confirmation screen 113 to be displayed five minutes after the replacement confirmation screen 113 in FIG. 15 is displayed. As can be seen from comparison between the scheduled finish times, the scheduled finish time “15:45” in FIG. 16 is updated to a time five minutes after the scheduled finish time “15:40” in FIG. 15.

According to the present modification, it is possible to display a more accurate scheduled finish time.

1 5.2 Modification 2

Figure 17:
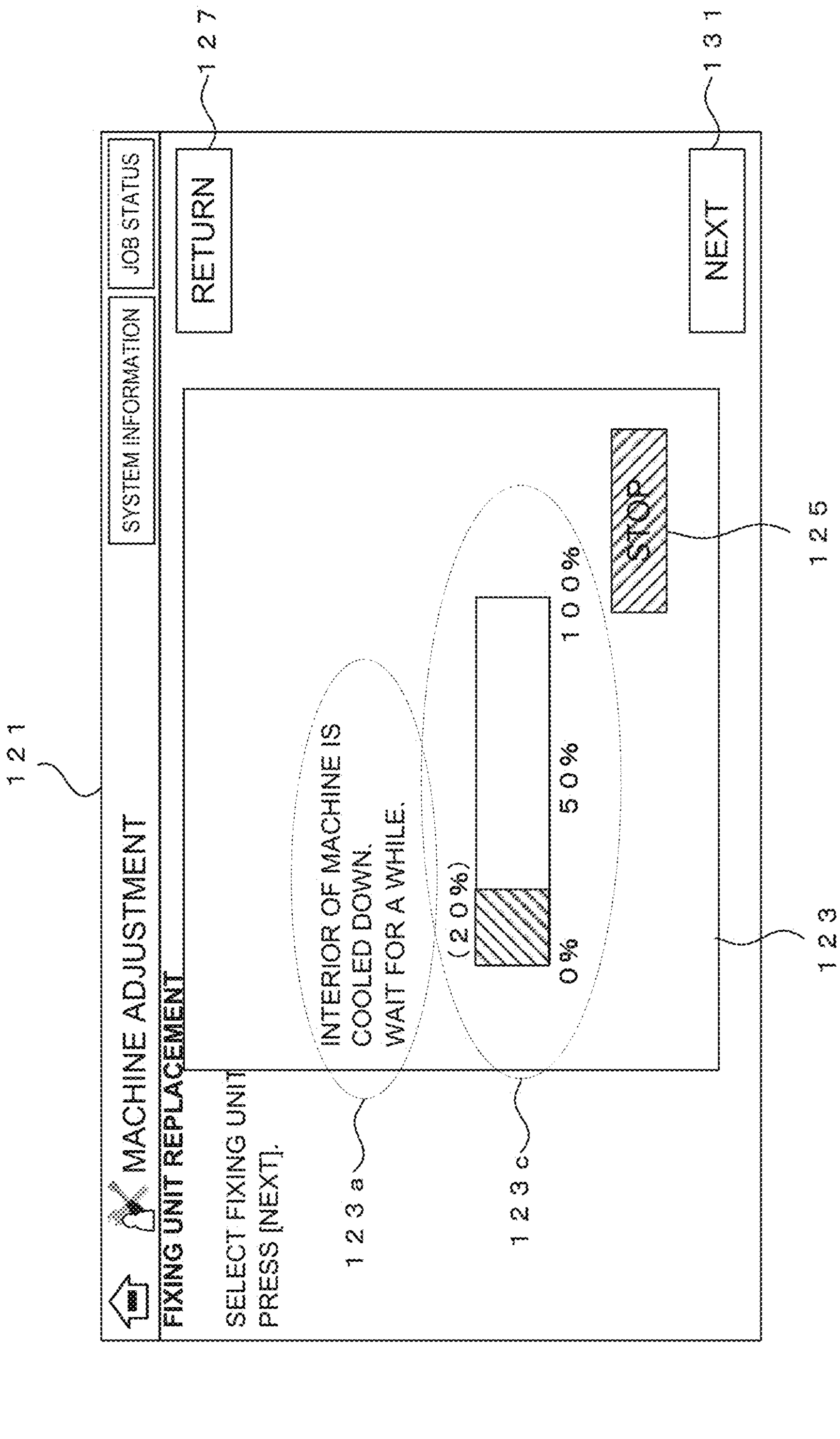
FIG. 17 is a diagram illustrating an example of a cooling-down screen to be displayed on the display of the image forming apparatus, when the fixing unit is replaced in modification 2 of the embodiment of the present disclosure.

The present modification is the one in which the cooling-down screen 121 in FIG. 13 to be displayed in step S27 is replaced with a cooling-down screen 121 in FIG. 17. In FIG. 13, the prediction information 123*b* is displayed as text information in the message area 123. In contrast, in the present modification, as exemplified by a progress bar 123*c* in FIG. 17, graphed prediction information is displayed. Specifically, after deriving a required time in the same manner as in the above-described embodiment, the one or more controllers 29 periodically compute a degree of progress of a cooling operation, and display a computation result on the display 3, as the progress bar 123*c*. Computation of a degree of progress is performed by deriving an elapsed time from start of a cooling operation, and deriving a ratio of the elapsed time to a required time in percentage.

According to the present modification, a progress status of a cooling operation can be displayed substantially in real-time.

1 5.3 Modification 3

In the present modification, when the required time is changed due to a change in an environmental condition, prediction information on a cooling-down screen is updated. The environmental condition is a condition regarding an environment in which the image forming apparatus 1 is disposed, and is particularly a temperature around the image forming apparatus 1. In the above-described embodiment, prediction information is generated based on a premise that the image forming apparatus 1 is operated while a general office environment is maintained. Therefore, in a case where the image forming apparatus 1 is installed in an extremely hot place or a cold place, there is a concern that prediction information may be deviated from actual progress. Further, when a cover of the image forming apparatus 1 is opened, and cold air is blown, the time required to complete the cooling is shortened.

In a case where a configuration of the cooler 18 is simple, for example, in a case where only an exhaust fan whose main purpose is to simply exhaust the air inside the housing of the image forming apparatus 1 is used, it is necessary to wait for the temperature of the fixing unit 15 to naturally decrease by heat radiation to the surroundings. At this occasion, the time required for the temperature of the fixing unit 15 to lower to a finishing temperature is affected by a temperature difference between the ambient temperature of the image forming apparatus 1, and the temperature of the fixing unit 15.

In view of the above, when prediction information is generated in step S25, the temperature monitor 33 computes a predicted temperature of the fixing unit 15 at a predetermined elapsed time (e.g., every one minute after start of a cooling operation), in addition to the above-described prediction information, and stores the predicted temperature in the storage 23. Then, during the cooling operation, the temperature monitor 33 measures the temperature of the fixing unit 15 by using the temperature sensor 17 every predetermined elapsed time, and derives a difference between the measured temperature and the predicted temperature at that time, which are stored in the storage 23.

When the derived difference exceeds a threshold value as a result of comparison of the difference with respect to the threshold value, the temperature monitor 33 performs steps S25 and S27 again, and updates the prediction information.

Figure 18:
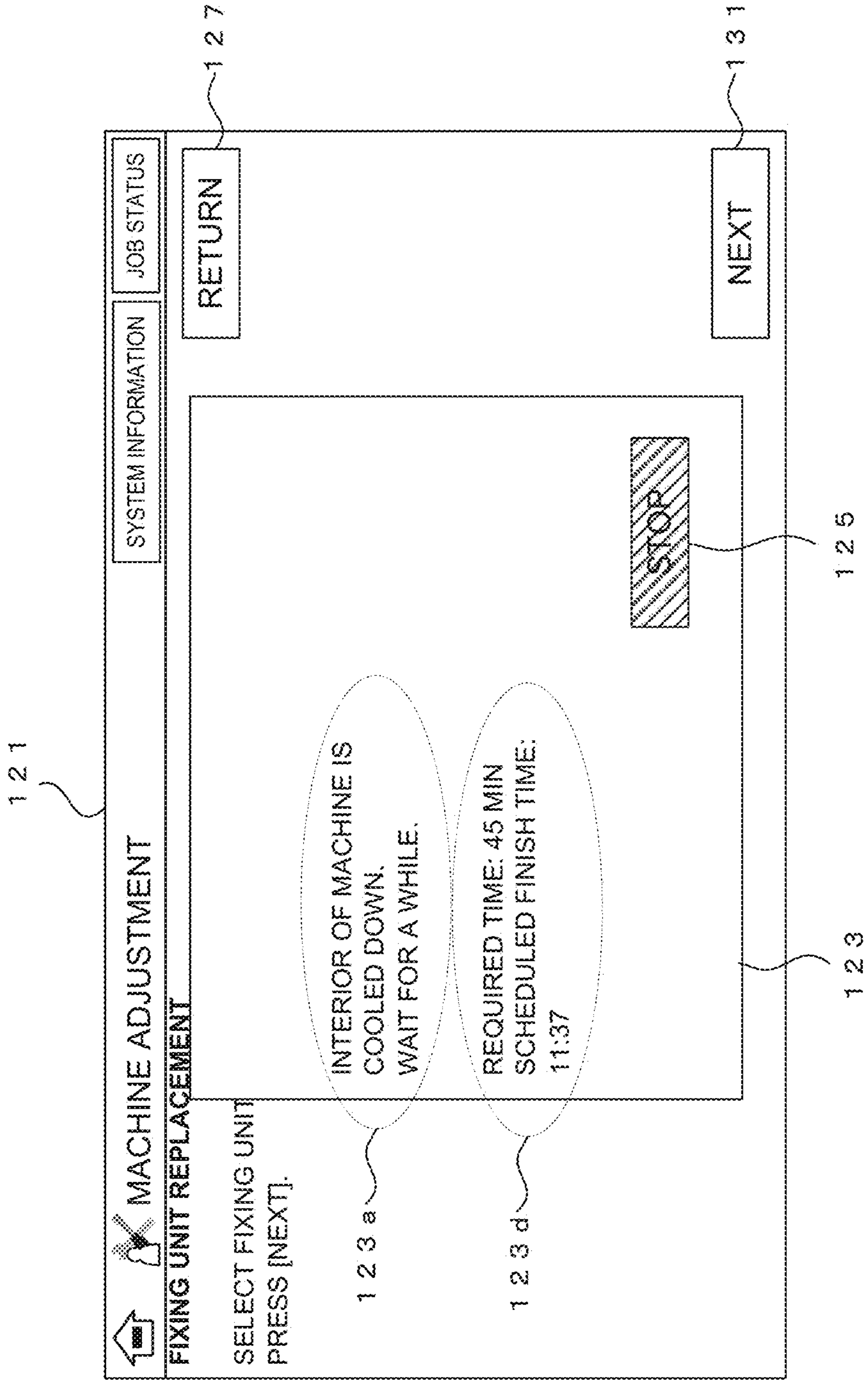
FIG. 18 is a diagram illustrating an example of a cooling-down screen to be displayed on the display of the image forming apparatus, when the fixing unit is replaced in modification 3 of the embodiment of the present disclosure.

In the present modification, after the cooling-down screen 121 in FIG. 11 is displayed immediately after start of a cooling operation, when time elapses, and after the environmental condition changes, both the required time and the scheduled finish time are updated. An example of the cooling-down screen 121 after the update is illustrated in FIG. 18. As compared with the prediction information 123*b* in FIG. 13, the required time is reduced by 15 minutes from 60 minutes to 45 minutes in the prediction information 123*d* in FIG. 18. In conformity with the above, the scheduled finish time is changed from 11:52 to 11:37, which also reduces the required time by 15 minutes.

According to the present modification, the prediction information can be updated according to a change in the environmental condition.

1 5.4 Modification 4

Figure 19:
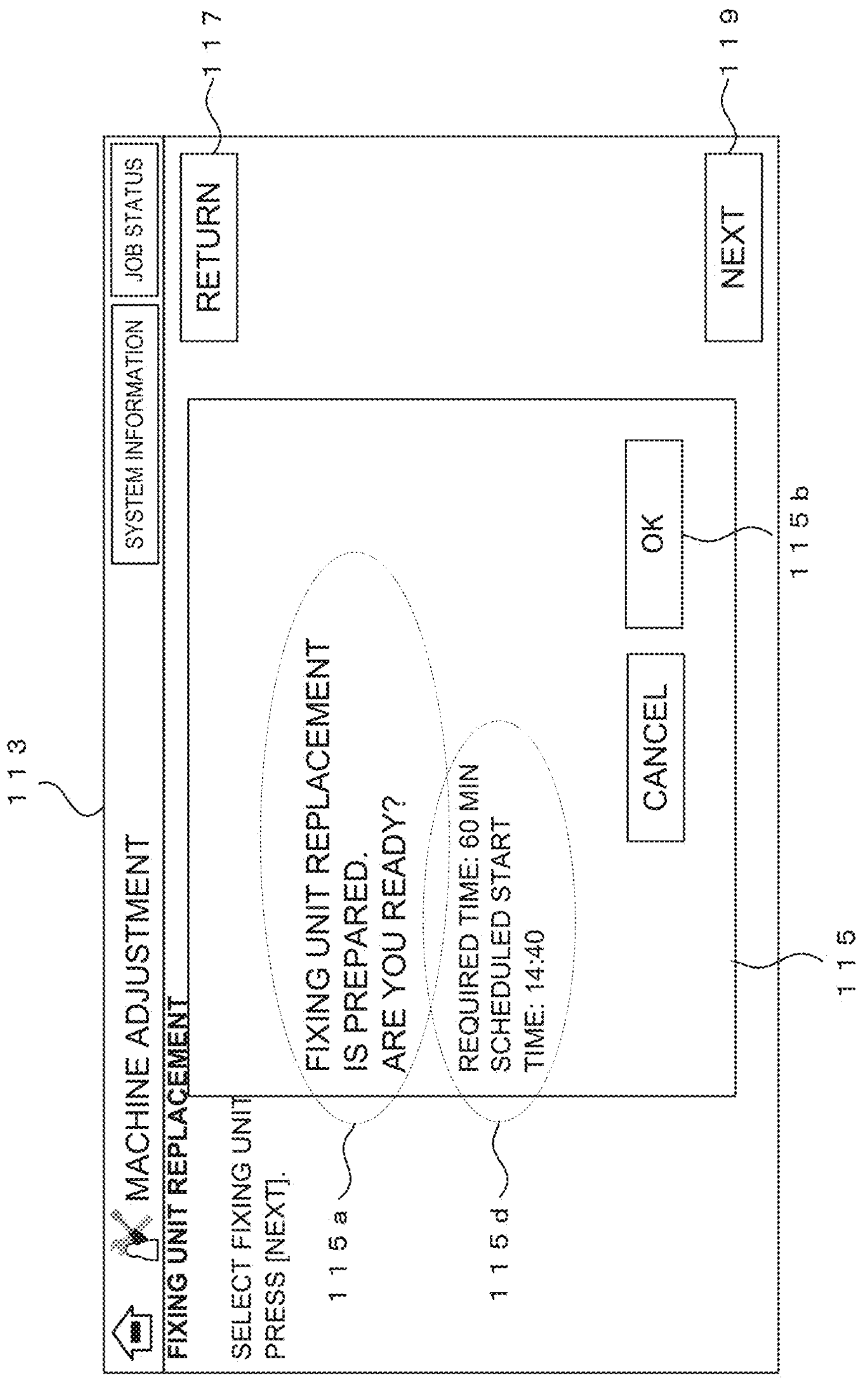
FIG. 19 is a diagram illustrating an example of a replacement confirmation screen to be displayed on the display of the image forming apparatus, when the fixing unit is replaced in modification 4 of the embodiment of the present disclosure.

In the present modification, before start of a cooling operation, a replacement confirmation screen 113 in FIG. 19 is displayed instead of the replacement confirmation screen 113 in FIG. 12. A required time and a scheduled start time are displayed on the replacement confirmation screen 113 in FIG. 19.

Figure 20:
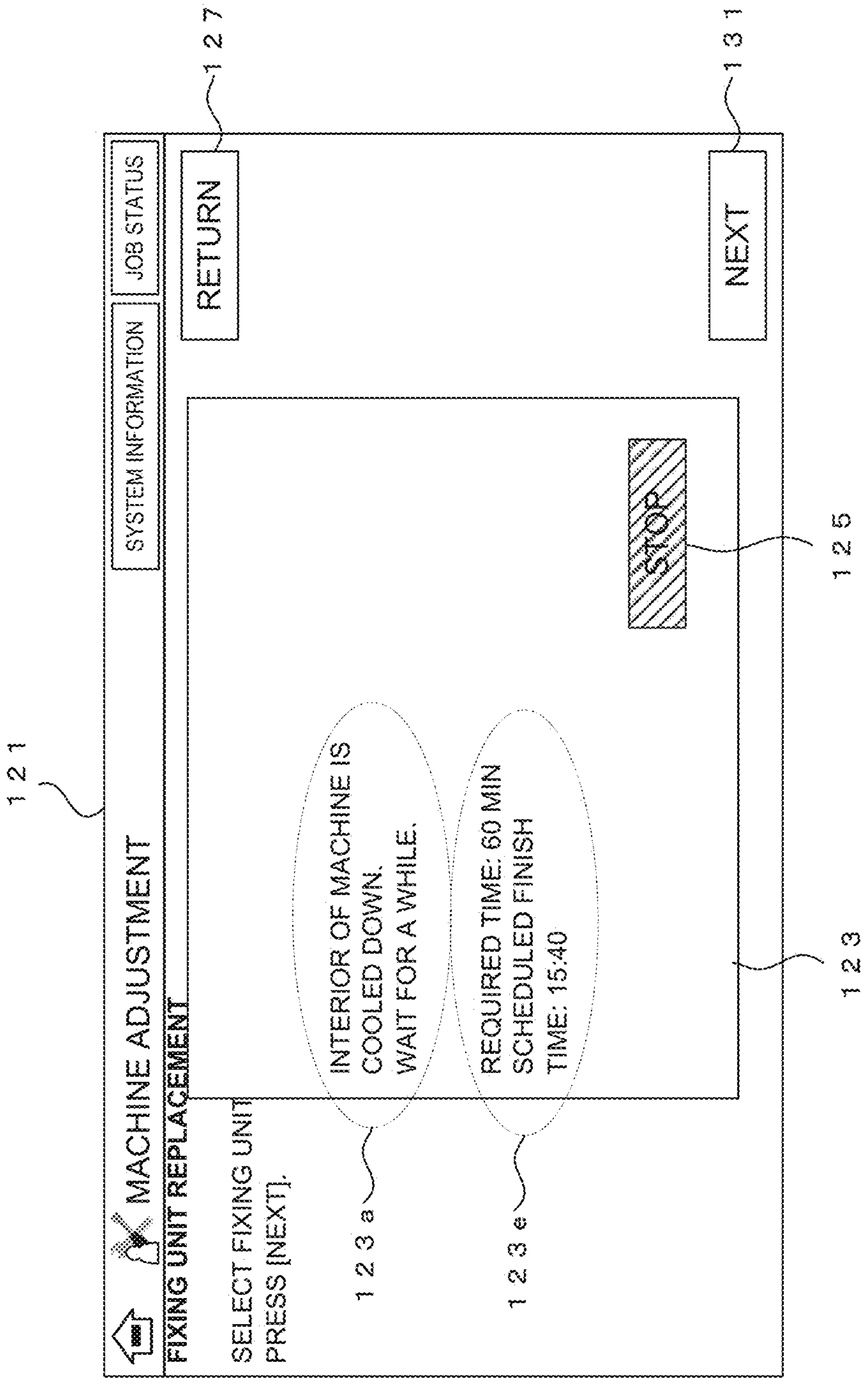
FIG. 20 is a diagram illustrating an example of a cooling-down screen to be displayed on the display of the image forming apparatus, when the fixing unit is replaced in the modification 4 of the embodiment of the present disclosure.

Further, in the present modification, after the cooling operation is started, a cooling-down screen 121 illustrated in FIG. 20 is displayed instead of the cooling-down screen 121 in FIG. 13. A required time and a scheduled finish time are displayed on the cooling-down screen 121 in FIG. 20.

A current time is used as the scheduled start time. The scheduled start time is preferably updated in real time. Since the scheduled finish time is computed based on a time when the OK button 115*b* is touched on the replacement confirmation screen 113 in FIG. 19, the scheduled finish time cannot be computed at a time before the OK button 115*b* is touched. By displaying the current time as illustrated in FIG. 19, auxiliary information related to a scheduled finish time can be provided to the user even before the OK button 115*b* is touched.

1.5.5 Modification 5

In the present modification, a start time of replacement work is set in the image forming apparatus 1, and the image forming apparatus 1 is shifted to a cooling operation after the set start time.

Figure 21:
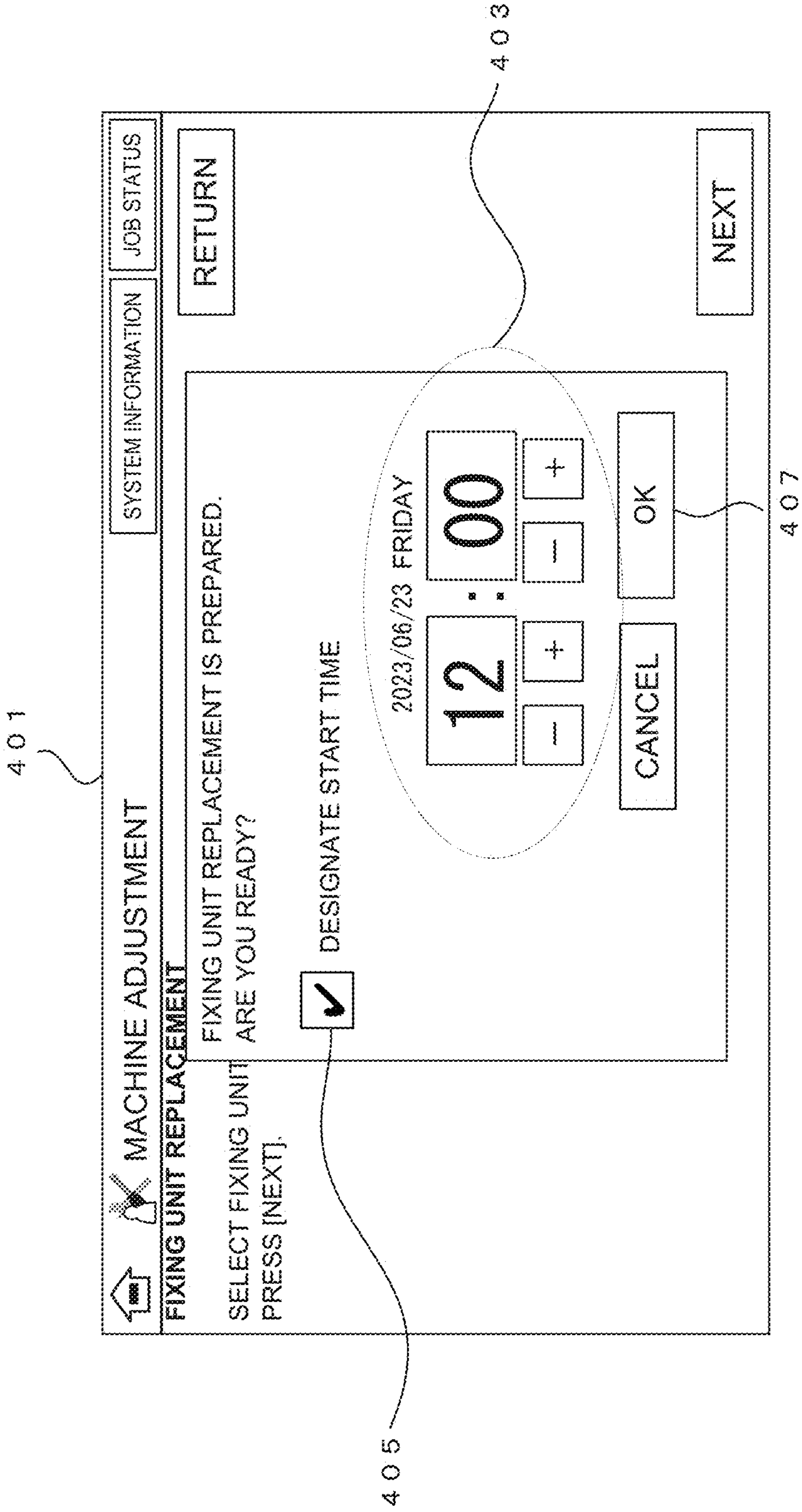
FIG. 21 is a diagram illustrating an example of a start time setting screen to be displayed on the display of the image forming apparatus, when a time for starting fixing unit replacement preparation is set in modification 5 of the embodiment of the present disclosure.

In step S13 in the above-described embodiment, a start time setting screen 401 in FIG. 21 is displayed in place of the replacement confirmation screen 113 in FIG. 12. When an OK button 407 is touched in a state that a check field 405 is unchecked, step S19 and thereafter are performed similarly to the embodiment.

Figure 22:
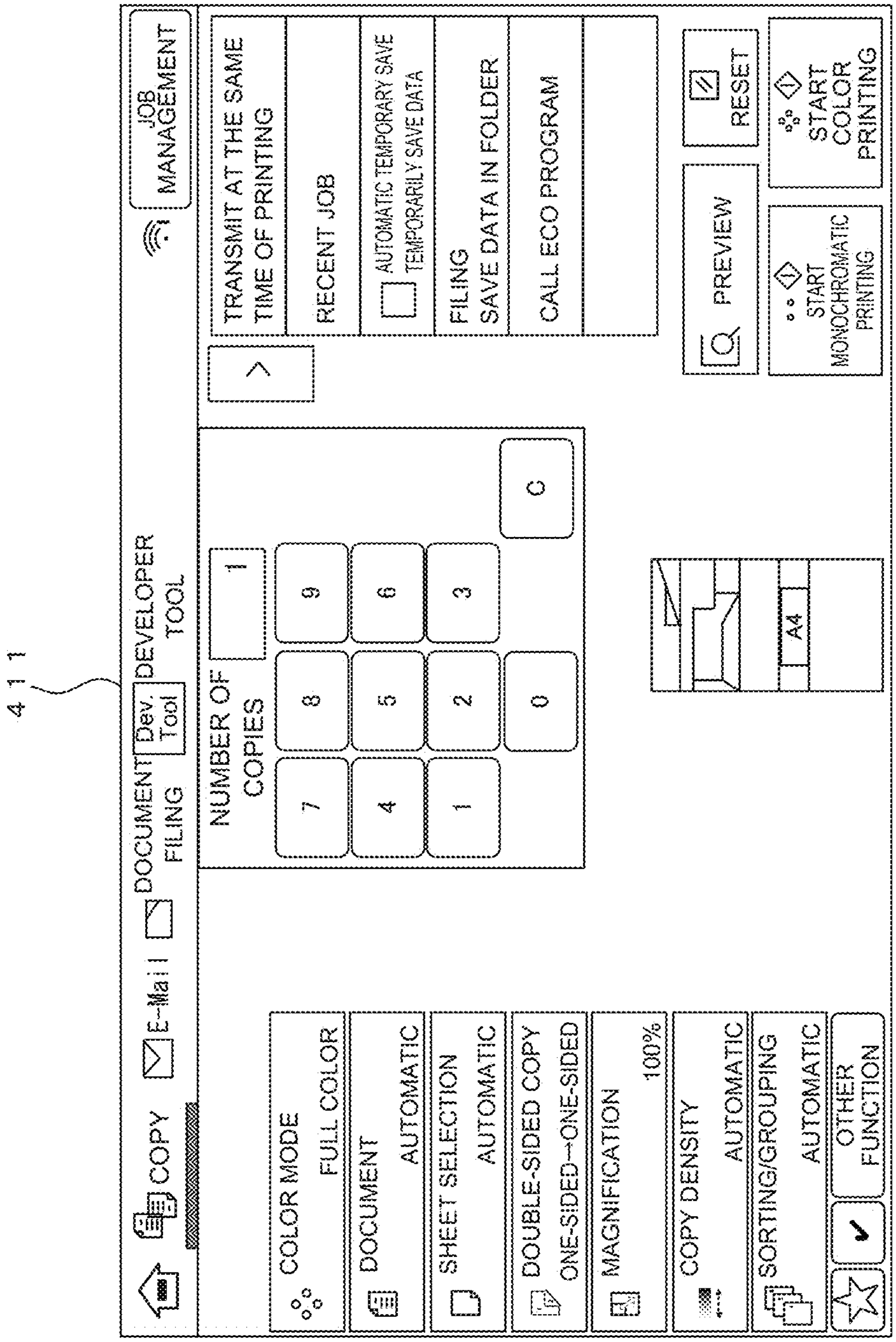
FIG. 22 is a diagram illustrating an example of a screen to be displayed by another function executable by the image forming apparatus, after a start time of fixing unit replacement preparation is set and before the start time in the modification 5 of the embodiment of the present disclosure.
Figure 23:
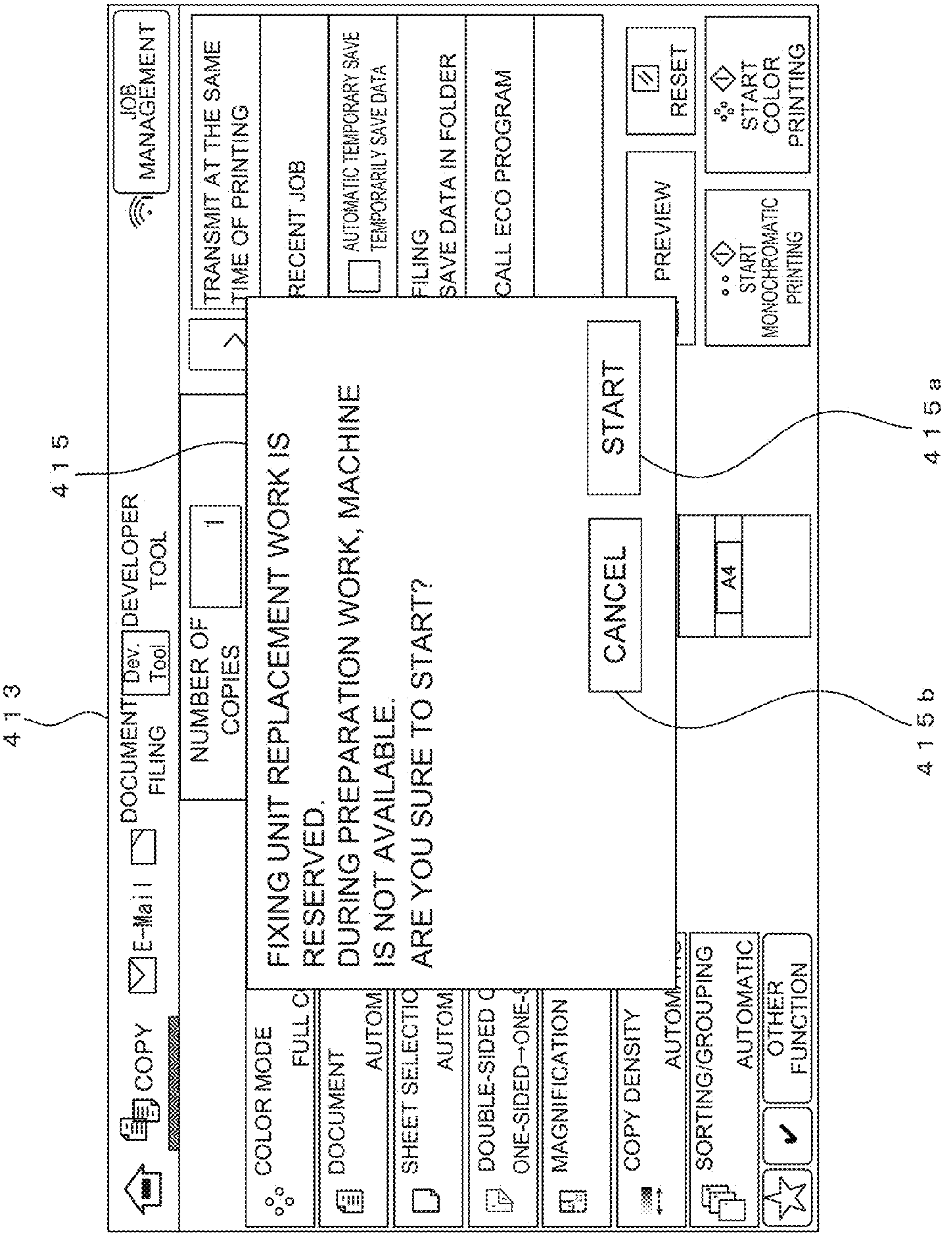
FIG. 23 is a diagram illustrating an example of a start confirmation screen to be displayed on the display of the image forming apparatus, when a start time has come during execution of the another function illustrated in FIG. 20 in the modification 5 of the embodiment of the present disclosure.

When the OK button 407 is touched in a state that the check field 405 is checked, notification that replacement work of the fixing unit 15 is started at a start time set in time settings 403 is set in the image forming apparatus 1. Thereafter, the user can perform work other than the replacement work for the image forming apparatus 1 until the start time comes. A screen 411 in FIG. 22 is an example of a screen related to a function executable by the image forming apparatus 1 during a time after a start time is set and until the start time comes. When the set start time comes, as illustrated in FIG. 23, a message area 415 is displayed on a screen 413 related to a function being used by the user in an overlapping manner. In the message area 415, a message informing the user that replacement work of the fixing unit is scheduled, and that the user cannot use functions of the image forming apparatus 1 during preparation work for the replacement work is displayed.

Figure 24:
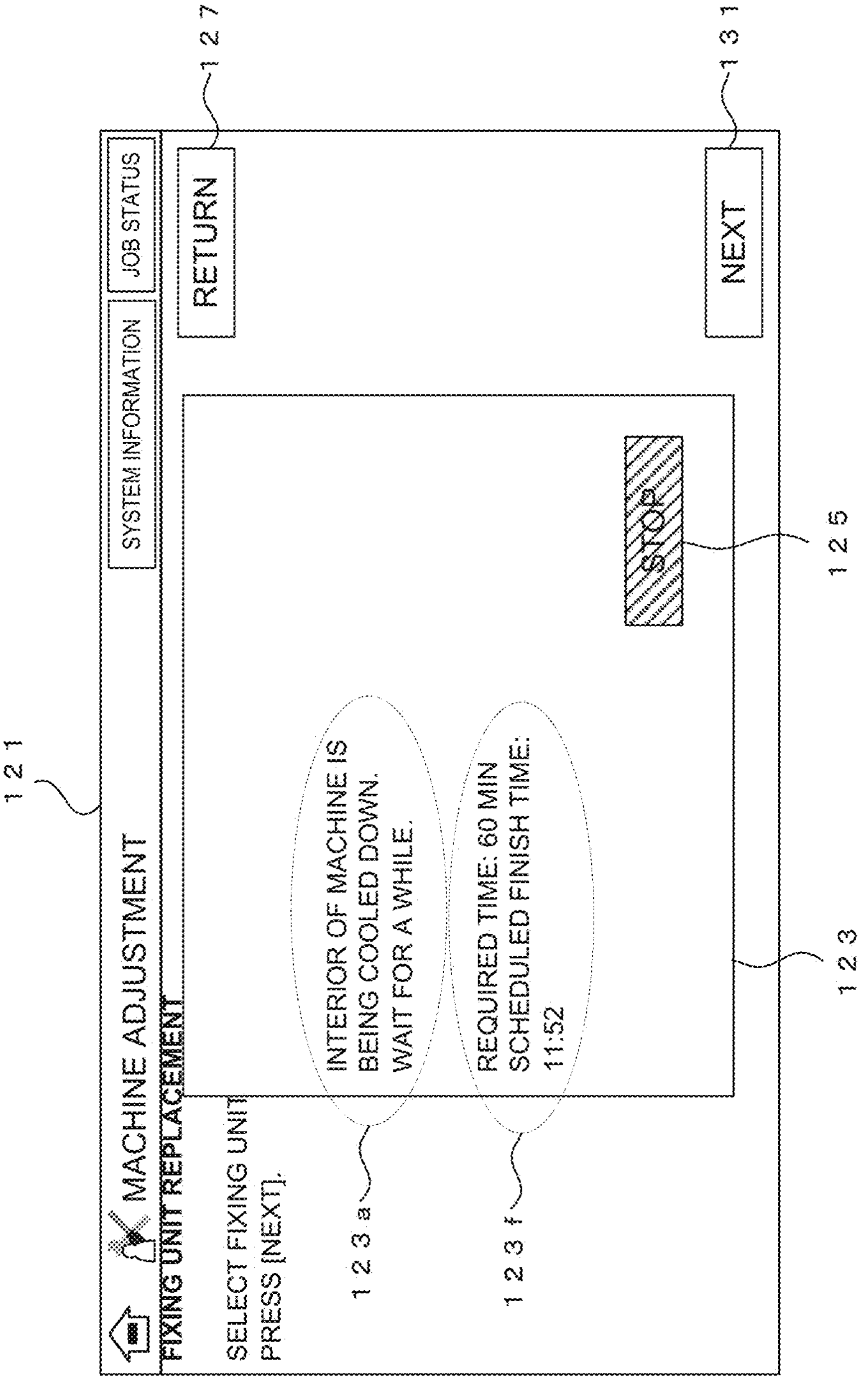
FIG. 24 is a diagram illustrating an example of a cooling-down screen to be displayed on the display of the image forming apparatus, when the fixing unit is replaced in the modification 5 of the embodiment of the present disclosure.

When a start button 415*a* is touched on the screen 413 in FIG. 23, a cooling operation is started, and a cooling-down screen 121 as illustrated in FIG. 24 is displayed. Thereafter, the control proceeds to steps S29 and S31 as in the case of the embodiment. When a cancel button 415*b* is touched on the screen 413 in FIG. 23, the set replacement work is canceled.

According to the present modification, the user can reserve replacement work of the fixing unit for the image forming apparatus 1.

1.5.6 Modification 6

In the above-described embodiment, in step S27, the cooling-down screen 121 in FIG. 13 is displayed. In the present modification, a cooling-down screen 121 in FIG. 25 is displayed instead of the cooling-down screen 121 in FIG. 13.

Figure 25:
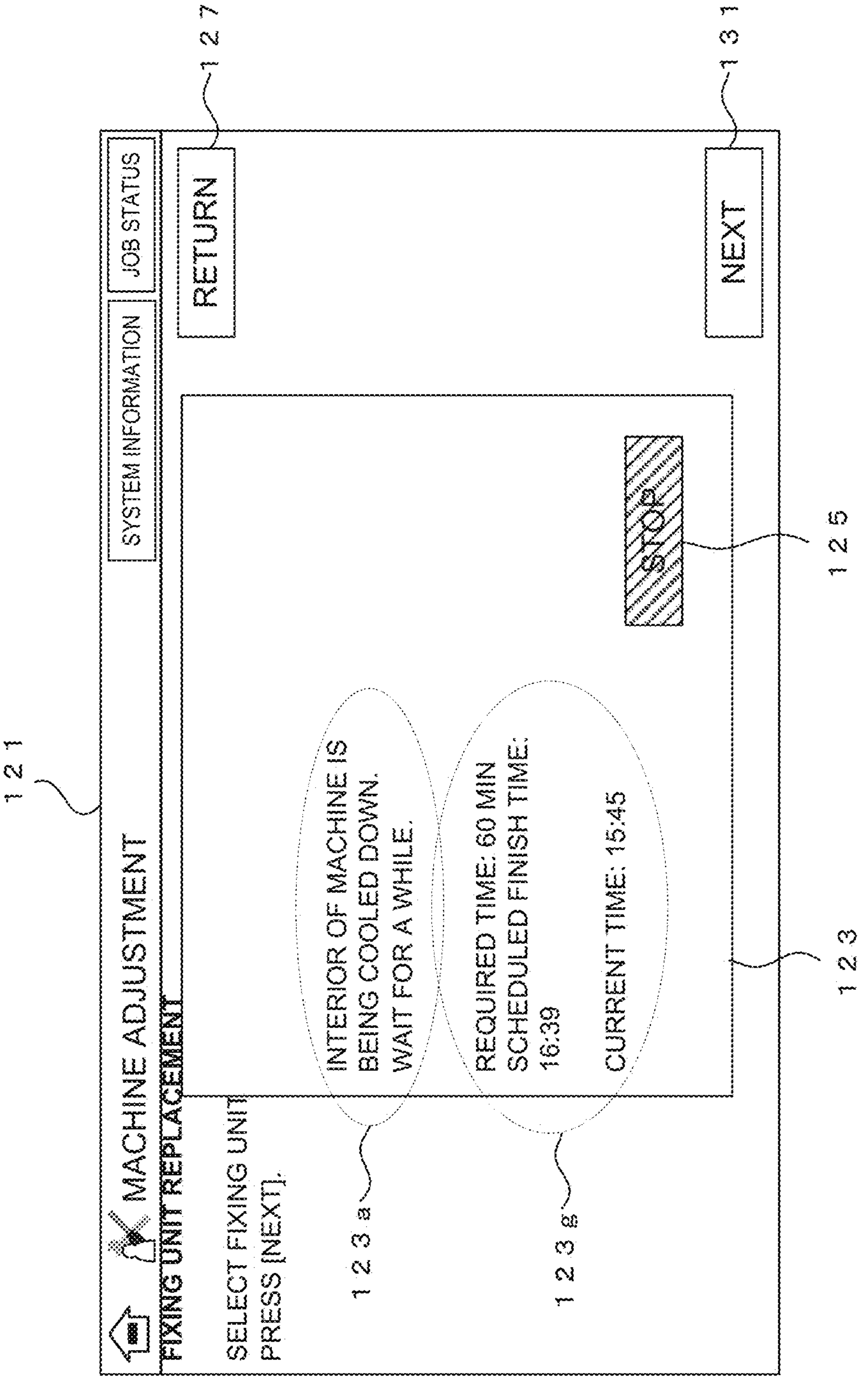
FIG. 25 is a diagram illustrating an example of a cooling-down screen to be displayed on the display of the image forming apparatus, when the fixing unit is replaced in modification 6 of the embodiment of the present disclosure.
Figure 26B:
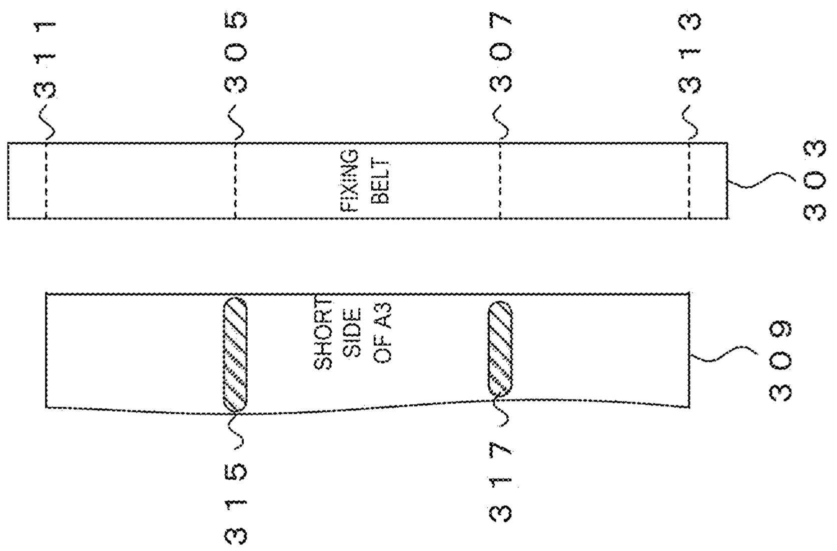
FIG. 26B is a diagram for describing stains generated on an A3 sheet, when the sheet passes on the fixing belt having scratches.
Figure 26A:
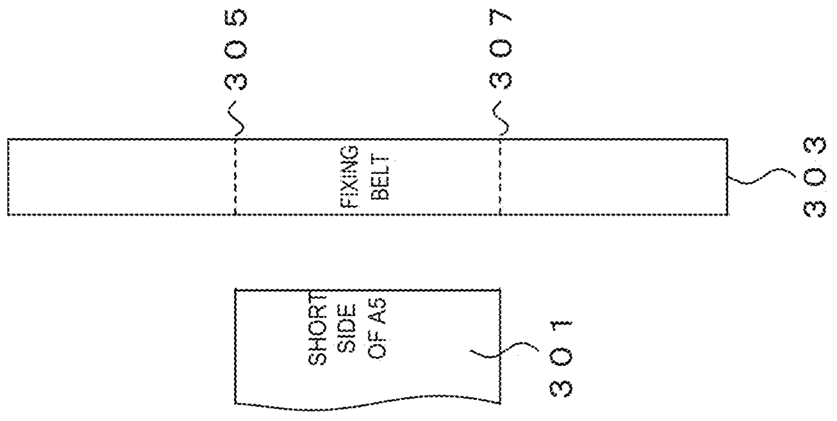
FIG. 26A is a diagram for describing scratches generated on a fixing belt, when an A5 sheet passes.
Figure 27A:
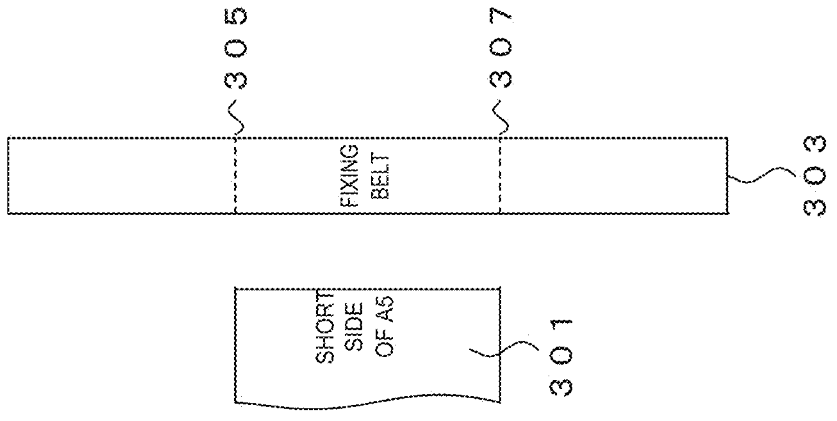
FIG. 27A is a diagram for describing scratches generated on a fixing belt for an A5 sheet, when the A5 sheet passes.
Figure 27B:
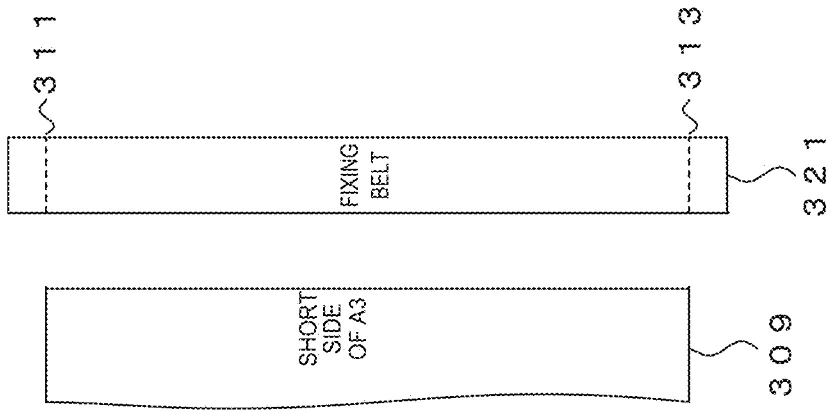
FIG. 27B is a diagram for describing scratches generated on a fixing belt for an A3 sheet, when the A3 sheet passes.

As compared with the cooling-down screen 121 in FIG. 13, on the cooling-down screen 121 in FIG. 25, prediction information 123*g* is displayed instead of the prediction information 123*b*. The prediction information 123*g* is different from the prediction information 123*b* in that the prediction information 123*g* includes a current time.

A current time included in the prediction information 123*g* is a current time indicated by a clock to be referred to when the image forming apparatus 1 generates time information. The current time may be generated by a circuit included in the image forming apparatus 1 itself, or may be, for example, time information acquired from a NTP server by using a network time protocol (NTP).

Displaying, as the prediction information 123*g*, a current time based on time information of the image forming apparatus 1 allows the user to know a deviation between a clock (e.g., a wristwatch, a smartphone, or the like) carried by himself/herself, and a time that is referred to by the image forming apparatus 1 as a reference. Therefore, the user can accurately know a time when a cooling operation is finished, even when there is a deviation between a time referred to by the image forming apparatus 1, and a time referred to by the user.

1.5.7 Other Modification

The present disclosure is not limited to the above-described embodiments and modifications, and various changes are available. Specifically, embodiments to be acquired by appropriately combining modified technical means within a range that does not depart from the gist of the present disclosure are also included in the technical scope of the present disclosure.

A program operating in each device in the embodiments is a program (a program causing a computer to function) that controls a CPU or the like in such a way as to achieve functions of the above-described embodiments. Further, information to be handled by these devices is temporarily stored in a temporary storage device (e.g., a RAM) at a time of processing, and thereafter, is stored in a storage device such as various read only memories (ROMs), and HDDs, and is read and corrected/written by the CPU as necessary.

Herein, a recording medium for storing the program may be any of a semiconductor medium (e.g., a ROM, a non-volatile memory card, and the like), an optical recording medium/magneto-optical recording medium (e.g., a digital versatile disc (DVD), a magneto optical disc (MO), a mini disc (MD), a compact disc (CD), a Blu-ray (registered trademark) disc (BD), and the like), a magnetic recording medium (e.g., a magnetic tape, a flexible disk, and the like), and the like. In addition, not only functions of the above-described embodiments are achieved by executing a loaded program, but also functions of the present disclosure may be achieved by processing the program jointly with an operating system, other application program, or the like, based on an instruction of the program.

Further, in a case of distributing the program in the market, the program can be stored in a portable recording medium and distributed, or can be transferred to a server computer connected via a network such as the Internet. In this case, it is needless to say that a storage device of the server computer is also included in the present disclosure.

While there have been described what are at present considered to be certain embodiments of the disclosure, it will be understood that various modifications may be made thereto, and it is intended that the appended claim cover all such modifications as fall within the true spirit and scope of the disclosure.

What is claimed is:

1. An image forming apparatus comprising:

one or more controllers;

a display;

a fixing unit that is detachable from the image forming apparatus; and a temperature measurer that measures a temperature of the fixing unit that is mounted on the image forming apparatus or that is in a vicinity of the image forming apparatus, wherein when the one or more controllers receive a replacement start instruction of the fixing unit that is mounted on the image forming apparatus, the one or more controllers initiate a cooling operation of the fixing unit that is mounted on the image forming apparatus, measure the temperature by the temperature measurer, and generate and display, on the display, prediction information related to finishing the cooling operation based on a measurement result received from the temperature measurer.

2. The image forming apparatus according to claim 1, wherein the prediction information includes a required time for lowering the temperature of the fixing unit that is mounted on the image forming apparatus to a predetermined temperature.

3. The image forming apparatus according to claim 1, wherein the prediction information includes a scheduled finish time to be predicted as a time when the temperature of the fixing unit that is mounted on the image forming apparatus is lowered to a predetermined temperature.

4. The image forming apparatus according to claim 1, wherein the one or more controllers repeatedly perform measurements, by the temperature measurer, and display, on the display, updated prediction information according to measurement results.

5. The image forming apparatus according to claim 1, wherein the one or more controllers display the prediction information on the display before the cooling operation is started.

6. The image forming apparatus according to claim 5, wherein the one or more controllers display, on the display, a current time or a scheduled start time, that is a time when the cooling operation is started, before the cooling operation is started, together with the prediction information.

7. The image forming apparatus according to claim 6, wherein the one or more controllers display, on the display, a scheduled finish time to be predicted as a time when the temperature of the fixing unit that is mounted on the image forming apparatus is lowered to a predetermined temperature after the cooling operation is started.

8. The image forming apparatus according to claim 5, wherein the one or more controllers display the prediction information on the display, and also display, on the display, an input screen, on which an input of a scheduled start time, that is a time when the cooling operation is scheduled to be started, is accepted, before the cooling operation is started.

9. The image forming apparatus according to claim 1, wherein the one or more controllers further display a current time on the display.

10. The image forming apparatus according to claim 1, wherein the one or more controllers further display, on the display, a graph indicating a degree of progress of the cooling operation based on the prediction information and a current time.

11. An operation method performed by an image forming apparatus that includes a fixing unit that is detachable from the image forming apparatus, the operation method comprising:

initiating a cooling operation of the fixing unit that is mounted on the image forming apparatus when receiving a replacement start instruction of the fixing unit that is mounted on the image forming apparatus;

measuring a temperature of the fixing unit that is mounted on the image forming apparatus or that is in a vicinity of the image forming apparatus; and generating and displaying prediction information related to finishing the cooling operation based on a result of the measurement.

* * * * *